(12) United States Patent
Yamanashi

(10) Patent No.: US 8,503,102 B2
(45) Date of Patent: Aug. 6, 2013

(54) WIDE ANGLE ZOOM LENS

(75) Inventor: Takanori Yamanashi, Woodland Hills, CA (US)

(73) Assignee: Panavision International, L.P., Woodlawn Hills, CA (US)

( * ) Notice: Subject to any disclaimer, the term of this patent is extended or adjusted under 35 U.S.C. 154(b) by 0 days.

(21) Appl. No.: 13/090,173

(22) Filed: Apr. 19, 2011

(65) Prior Publication Data

US 2012/0268831 A1 Oct. 25, 2012

(51) Int. Cl.
*G02B 15/14* (2006.01)

(52) U.S. Cl.
USPC .......................................... 359/694; 359/686

(58) Field of Classification Search
USPC ................................................. 359/694, 686
See application file for complete search history.

(56) References Cited

U.S. PATENT DOCUMENTS

| | | | |
|---|---|---|---|
| 3,705,759 A | 12/1972 | Cook et al. | |
| 3,771,853 A | 11/1973 | Nakamura | |
| 5,000,550 A | 3/1991 | Takahashi et al. | |
| 5,253,113 A | 10/1993 | Sekita et al. | |
| 5,416,639 A | 5/1995 | Yamanashi | |
| 5,668,668 A | 9/1997 | Shibayama et al. | |
| 6,285,509 B1 | 9/2001 | Nakayama et al. | |
| 6,639,721 B2 | 10/2003 | Endo | |
| 6,687,059 B2 | 2/2004 | Mihara | |
| 6,785,055 B2 | 8/2004 | Nishikawa et al. | |
| 7,126,759 B2 | 10/2006 | Sensui | |
| 7,359,125 B2 | 4/2008 | Kimura et al. | |
| 7,508,592 B2 | 3/2009 | Harada | |
| 7,599,123 B2 | 10/2009 | Yamamoto | |
| 2007/0070517 A1* | 3/2007 | Harada | 359/680 |

FOREIGN PATENT DOCUMENTS

| | | |
|---|---|---|
| JP | 10-020190 A | 1/1998 |
| JP | 2-867813 B2 | 3/1999 |
| JP | 3-134611 B2 | 2/2001 |
| JP | 2001-042217 A | 2/2001 |
| JP | 3-144153 B2 | 3/2001 |
| JP | 3-226297 B2 | 11/2001 |
| JP | 2001-318314 A | 11/2001 |
| JP | 2001-350096 A | 12/2001 |
| JP | 3-284784 B2 | 5/2002 |
| JP | 2002-244044 A | 8/2002 |

(Continued)

OTHER PUBLICATIONS

Matsui, Y. et al. (1993). "Practical Aberration Theory," Chapter 3 in *Fundamentals of Practical Aberration Theory: Fundamental Knowledge and Technics for Optical Designers*, World Scientific Publishing Co. Pte. Ltd., pp. 66-69, 74-77.

(Continued)

*Primary Examiner* — James Jones

(57) ABSTRACT

Embodiments of a zoom lens system may comprise at least four lens groups having a NPNP power sequence. The first lens group may include a stationary lens element. The second through fourth lens groups may be movable during zooming. An additional movable N or P lens group on the image side of the system may correct field curvatures or astigmatism. The first lens group may include a stationary, N first lens subgroup and an N second lens subgroup having a movable lens element for focusing. The first lens group may contribute to low focus breathing. Multiple lens groups may have matching movement plans. Some embodiments may be high speed and have a first lens group that can be stationary during zoom. Some embodiments may have only one aspheric surface.

15 Claims, 26 Drawing Sheets

(56) References Cited

FOREIGN PATENT DOCUMENTS

| | | |
|---|---|---|
| JP | 2002-287031 A | 10/2002 |
| JP | 2002-311330 A | 10/2002 |
| JP | 2002-350727 A | 12/2002 |
| JP | 3-414499 B2 | 6/2003 |
| JP | 2004-061679 A | 2/2004 |
| JP | 3-508273 B2 | 3/2004 |
| JP | 2004-240038 A | 8/2004 |
| JP | 2005-049843 A | 2/2005 |
| JP | 2005-077548 A | 3/2005 |
| JP | 2005-309124 A | 11/2005 |
| JP | 2006-058584 A | 3/2006 |
| JP | 2006-184723 A | 7/2006 |
| JP | 2006-337647 A | 12/2006 |
| JP | 2007-093976 A | 4/2007 |
| JP | 2007-094168 A | 4/2007 |
| JP | 4-006073 B2 | 11/2007 |
| JP | 2007-328162 A | 12/2007 |
| JP | 2008-026880 A | 2/2008 |
| JP | 2008-046208 A | 2/2008 |
| JP | 4-174204 B2 | 10/2008 |
| JP | 2008-233585 A | 10/2008 |

OTHER PUBLICATIONS

Zuegge, H. et al. (Jun. 26, 1997). "A Complete Set of Cinematographic Zoom Lenses and Their Fundamental Design Considerations," *Proceedings of the 22$^{nd}$ Optics Symposium*, Japan, 22:13-16. (6 pages total).

* cited by examiner

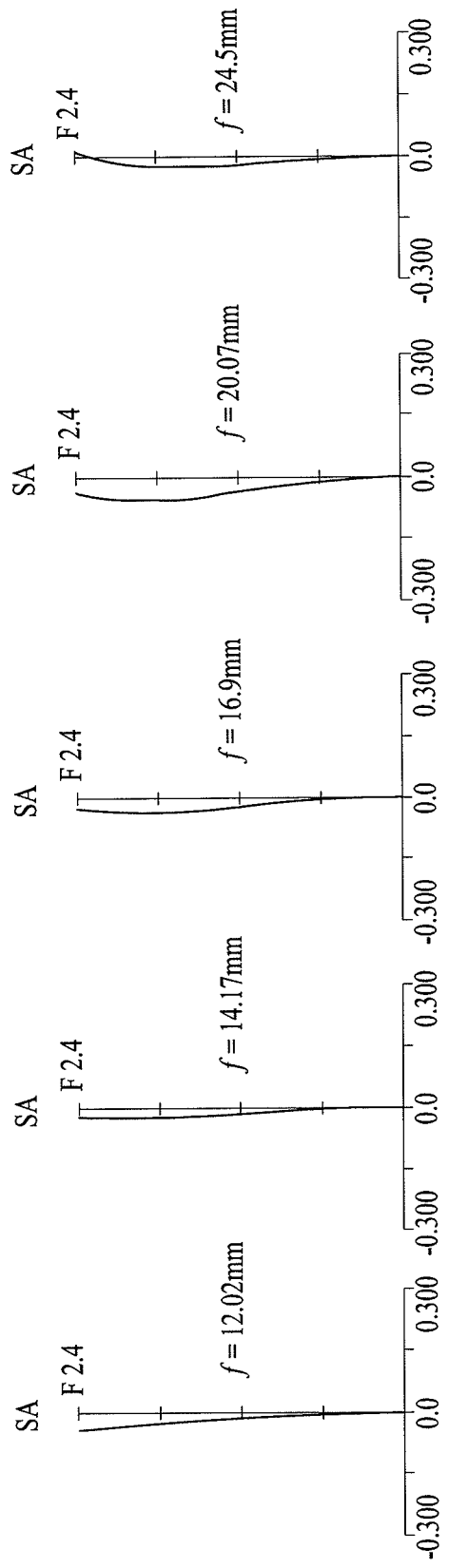

WIDE ANGLE ZOOM LENS

FIELD

This relates to zoom lens systems, such as wide angle zoom lens systems and even high-speed wide angle zoom lens systems. Embodiments of this zoom lens system may be particularly advantageous for image capture devices in cinematography applications.

BACKGROUND

Zoom lens systems have been used in a variety of applications, such as image capture devices for capturing still images or moving images. Examples of still images may include static pictures of landscapes, wildlife, or sports. Examples of moving images may include motion pictures of movies shot on film and digital imaging means. Although zoom lens technologies are known for all of these various applications, differences in these applications may lead to variations in the development of zoom lens systems for different applications, such as combinations in power distributions with different configurations for each application. In other words, one zoom lens system may be more suitable than another for a certain application.

In order to achieve a well-balanced wide angle zoom lens, an optical system requires the characteristics of a wide angle lens at the wide angle zoom setting. The optical system would also have the characteristics of a lens with longer focal lengths, which covers narrower fields of view. Achieving all these characteristics requires appropriate power distributions and an appropriate zoom lens type, which can correct characteristic aberration changes during zooming and focusing.

Focus Breathing

By way of example, considerations that may be significant for capturing moving images may be negligible or non-existent for capturing still images. One such consideration may be the effect of focus breathing. When the focus of a lens system is adjusted, lens elements for focusing may move. This movement may result in a change in the total focal length of the lens system. As total focal length may be related to zooming, the field of view (or angle of view) may change, similar to a zooming effect. For instance, as one changes the focus back and forth between the foreground to the background, the field of view may change such that it appears to be "breathing" (or zooming in and out) during the focus adjustment in real-time. Although these changes in the field of view may actually result from adjustments in focus settings, the changes may appear to be results from adjustments in zoom settings, even when zoom settings have not been adjusted.

In an example from a cinematography application, such as a movie scene, one may want to change focus from one actor to another actor during a conversation in the same field of view without changing the field of view, i.e., without focus breathing. Significant changes in the field of view during multiple focus adjustments may be undesirably distracting at a wide field of view, which has a deep depth of field.

When capturing a particular still image, one may be concerned about using a particular frame for that particular still image capture, not about maintaining the same particular frame for the next still image capture. With respect to this particular still image capture, the next still image capture may be completely unrelated in its framing. In other words, unlike capturing moving images, capturing still images may generally involve little or no concern about maintaining the same field of view for different still image captures with different focus settings. Furthermore, focus breathing may be detected during focus changes in real-time capturing of motion pictures, but effects during real-time focus changes may be ignored or even often unnoticed when capturing still images. Accordingly, capturing still images may generally involve little or no concern related to focus breathing.

Even when capturing moving images, focus breathing may still be a minor or negligible concern in some applications. For instance, a user of an ordinary video camcorder may be satisfied with an image capture device having a simpler optical lens system that does not include such precise controls for field of view and focusing.

However, for cinematography, the change in field of view during focusing with a wide angle lens may not be negligible. The reason is the deep depth of field. Thus, for wide angle lenses and wide angle zoom lenses, it is recommended to correct focus breathing.

Lens Shade

In addition to focus breathing, cinematography applications may also involve other considerations. For example, in order to provide high-quality image capturing for professional-level motion pictures, it is generally desirable to remove or reduce unwanted imaging effects on the captured image. Lighting may be a crucial variable to control, and collecting light from unintended light sources with high intensity may lead to some generally undesirable effects, such as ghost images which are formed by total reflections within lens surfaces and multiple reflections among lens surfaces.

In order to limit incoming light into a camera lens system from unintended sources, such as unwanted sunlight and spotlight for illumination, a lens shade (e.g., a matte box) may be attached to the outer lens barrel at the front of a lens system in a cinematography application. If the lens shade is too short, unwanted light may enter the lens system. If the lens shade is too long, designated rays may be clipped, and the lens shade itself may interfere with the incoming rays to cause vignetting and corner illumination fall-off. A lens system with a fixed front lens group may lead to fewer or no adjustments of the lens shade size and/or position. A zoom lens system with a front lens group that moves during zoom or focus may require designing a lens shade with critical points of footprints of rays, and such designing may lead to a lens shade that is too small at longer focal length settings. Therefore, for applications in cinematography, it may be highly advantageous to employ a lens system with a fixed front lens group that is stationary during functions that may involve moving lens elements, such as zoom and focus. Conversely, it may be uncommon to practice applications in cinematography with a lens system having a moving front lens group.

Lens Speed

For cinematography applications, lens speed may be another common consideration. Lens speed can be correlated to the maximum aperture stops of a lens, which can be quantified in terms of an F-number. The diameter of the aperture stop and F-number are inversely related, so the maximum diameter of aperture stop would correspond to a minimum F-number. Also, a lens with a larger aperture would have a smaller F-number, and vice versa. For example, lens A having a larger maximum aperture (smaller minimum F-number) will be able to pass through more light or marginal rays to the film (or image sensor) than lens B having a smaller maximum aperture (larger minimum F-number). Lens A would enable a faster shutter speed than lens B. Therefore, lens A (with a smaller minimum F-number) would be "faster" than lens B (with a larger minimum F-number). In other words, a larger aperture leads to a "faster" lens.

A common concern in cinematography applications is shooting pictures under lower illumination environments. For such environments in dim lighting, higher lens speeds and shallow depth of field are generally preferred. For example, a lens of relatively high speed may have an F-number of 2.8 or smaller.

In some applications, it may be desirable to attain image captures with specific areas that are out-of-focus, or "bokeh." Bokeh can occur in an image area that is outside the depth of field. Faster lenses can have a shallower depth of field, which can be useful for providing images with bokeh. Thus, a high-speed lens may be required to attain images with a desirable amount of bokeh.

A similar parameter used in cinematography is T-number T/#. T-number is like F-number but additionally adjusted for the amount of light transmitted through the lens in actual usage. For instance, at a given lens aperture, the T-number will equal the F-number if the lens has 100% transmission, i.e., no loss of light. However, as light passes through a lens, there is loss (e.g., through absorption by the glass materials). Therefore, the T-number will be larger than the F-number. For cinematography applications, a minimum T-number smaller than 2.8 may be preferred. The use of T-number is relatively uncommon outside of cinematography.

Wide Angle Zoom Lenses

There are many types of zoom lenses, and one general way to distinguish between them is by the field of view (FOV, also known as angle of view) and the zoom ratio that they provide. A wide angle zoom lens generally starts with a wide angle of view at the wide end of its zoom range, which may be utilized for the perspective effect and deeper depth of field. For instance, an exemplary wide angle zoom lens may have some FOV values of 70 degrees or more, but an exemplary telephoto zoom lens may start with some FOV values of 30 degrees or less at the wide end of its zoom range.

In addition to different FOV values, there are other general distinguishing points between wide angle zoom lenses and telephoto zoom lenses. As an example, wide angle zoom lenses are generally used in association with shooting an overview of a scene and utilizing perspective with deeper depth of field at the wide end. A wide angle zoom lens may also cover closer to the FOV covering standard to near a telephoto region having a shallower depth of field. But a telephoto zoom lens is generally used in association with a shallow depth of field, and the perspective is different from the perspective of wide angle zoom lenses throughout its zoom range.

Although there may be no specific technical definition of a wide angle zoom lens, still photographers may recognize that a focal length of smaller than 28 millimeters for 135 format (24×36 mm) is a wide angle lens. Its FOV is 75.38 degrees. If the FOV is wider than 84 degrees, it may be called a super wide angle lens. Wide angle zoom lenses may include the equivalent focal length of 28 millimeters of 135 format size at the wide end.

Due to the different visual effects provided by different focal length ranges of different zoom lenses, cinematography applications may employ a wide variety of zoom lenses for presenting images according to different purposes. For example, a wide angle zoom lens may be used for capturing scenes with wide angles of view, which may provide a sense of exaggerated distance between objects in the captured image. Also, a wide angle zoom lens may capture images with deep depths of field, especially at smaller aperture, so that most or all of the objects in the capture image are in focus.

Prior Art Zoom Lenses

Although zoom lens systems are known for many various applications, not all zoom lens systems are applicable for all these various applications. For example, a given zoom lens system may be particularly designed for a certain application, but not suitable for another application. Additionally, combining techniques of different zoom lens systems may involve complicated considerations and may not be simple to realize.

U.S. Pat. No. 3,771,853 to Nakamura discloses a 4-group zoom lens with an exemplary angle of view of 74 degrees. The power sequence of the 4 lens groups is negative-positive-negative-positive, or NPNP. All of the lens groups are movable during zoom, including the first (or front) lens group that has the front lens element. Due to this motion of the front lens element, using Nakamura's zoom lens system with a lens shade may require many adjustments of the lens shade size and/or position in order to compensate for the different positions of the moving front lens element, as discussed above. Such many adjustments may be time-consuming and cumbersome. This type of zoom lens may be wide angle or have a short focal length. Also, the exit pupil distance may be short in Nakamura's type of zoom lens. When applied with an image sensor for digital imaging, a zoom lens system with a short exit pupil distance may have undesired pixel vignetting. Accordingly, Nakamura's zoom lens design may be undesirable for use with a movable front lens element, which may introduce operational issues for photographers. The lens shade or matte box may need to move with front lens group motion.

U.S. Pat. No. 5,416,639 to Yamanashi demonstrates zoom lens teachings including wide angle zoom lens embodiments with 5 lens groups having a power sequence of NPNPP. The first and fifth lens groups are stationary during zoom. The number of degrees of freedom on zoom may be three for aberration corrections. The fifth lens group may operate as a field flattening lens, and it can lead to a zoom lens that operates closer to a telecentric optical system with given power distributions. Due to this telecentricity, the corner illumination may be decreased by the restrictions of the lens mount area, such as limitations of the mechanical mount and its diameter restrictions. The resulting corner illumination may be poor. Moreover, field curvature and distortion during zoom may not be corrected well. It may not be possible to compensate these aberrations through the use of aspheric surfaces because the zoom movements may affect changes in the aberrations. With these zoom lens teachings, the positions on entrance pupils may be long so that the diameter of the front lens element may become large at the "wide" zoom position.

A short paper entitled "A complete set of cinematographic zoom lenses and their fundamental design considerations," by Zuegge et al. provides teachings for zoom lenses for cinematography applications. Zuegge et al. mentions that its zoom lenses are for cinematography and have high performance that is as good as fixed focal length lenses with smaller aperture relative to conventional zoom lenses. The size and weight issues of a zoom lens are pointed out. The basic zoom type is PNP and, for wide angle zoom, the first group is split into two subgroups and the second positive subgroup is used for focusing. For long focal length zoom lenses, the focusing lens employs two separated groups which can be called internal focusing. Although overall lengths of these zoom lenses are fixed and they have internal focusing, the zoom ratio is approximately two.

SUMMARY

This relates to zoom lens systems, such as wide angle zoom lens systems. Embodiments may be applicable as visible image formation systems. Embodiments of this system may be especially relevant for cinematography and photography applications.

Embodiments may comprise at least four lens groups. In order from the object side to the image side, the power sequence of these five lens groups may be negative-positive-negative-positive, or NPNP. The first lens group may include a stationary lens element, and the second through fourth lens groups may be movable during zooming.

Generally, designing a wide angle zoom lens may include considerations of field curvatures, distortions, and chromatic aberrations. Even with the aid of aspheric surfaces, it may still be difficult to design a wide angle zoom lens due to changes in field aberration during zoom. However, some embodiments may incorporate an additional positive or negative (P or N) movable lens group that is located on the image side of the system and is able to correct field curvatures or astigmatism fairly well. During movement of this movable lens group, subtle corrections to the field curvature can be achieved.

In some embodiments, the first lens group may include a stationary, negative first lens subgroup and a negative second lens subgroup having a movable lens element for focusing. The first lens group may contribute to low focus breathing.

In some embodiments, multiple lens groups may have matching movement plans, which may be mechanically simpler to implement and less costly to produce than systems without matching movement plans.

Some embodiments may be high speed and have a first lens group that can be stationary during zoom. Due to such aspects, significant benefits may include fixed overall length and high speed with excellent optical performance.

Some embodiments may have only one aspheric surface, which can be easier to manufacture than systems with two or more aspheric surfaces.

BRIEF DESCRIPTION OF THE DRAWINGS

FIGS. 6B-6D illustrate aberration graphs of the fifth embodiment.

DETAILED DESCRIPTION

Figure 1A:
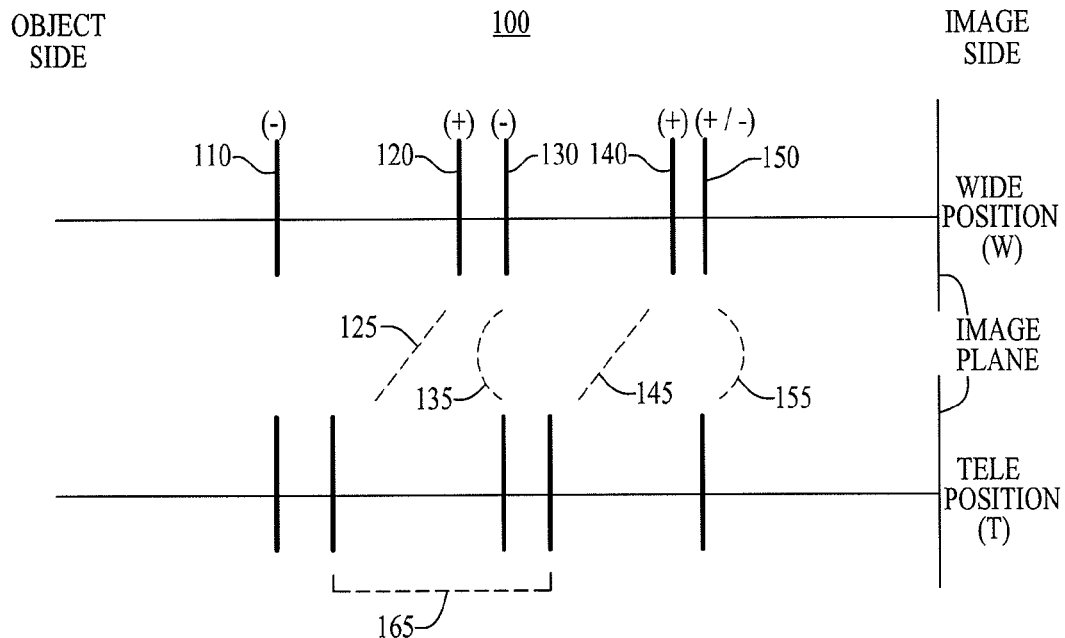
FIG. 1A-1B illustrates principles of an inventive system.

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Design Considerations for Wide Angle Zoom Lenses

It is generally more difficult to correct aberrations such as field curvatures, distortions, and lateral chromatic aberrations in wide angle zoom lenses than in zoom lenses with smaller FOV. FOV may be expressed in angle degrees. The following equation provides an expression of FOV.

$$FOV: \text{field of view} = 2 * \arctan\left(\frac{y}{EFL}\right)$$

In this equation, y=½ of the size of the film (or image sensor) along its diagonal, and EFL=effective focal length. In a zoom lens system, the size of the film (or image sensor) would not change, so y would be constant.

Based only on this simple equation, it may appear that designing a wide angle zoom lens would simply involve a small effective focal length at the wide end (which would mean a wide FOV) and covering narrower FOV via the telephoto end. However, during zoom from the wide end to the telephoto end, aberration change can occur. Therefore, achieving a successful zoom lens design is like solving a highly complex formula of many variables (e.g., effective focal length, lens element number, size, material, etc.). Arbitrarily modifying one variable can lead to undesired changes in other variables. Then, in order to meet desired specifications for the total optical performance, there may be many other variables to change to compensate for such undesired changes. Effective focal length (or FOV) is one parameter that affects many other aspects of a zoom lens system, so properly modifying the focal length (or FOV) would require due consideration of the effect on the other related aspects in the system, more specifically such as a zoom lens configuration and the type. Otherwise, the performance of the zoom lens system may become unacceptable.

Additionally, a real optical system may be generally bound by practical limitations of real lens elements, thus limiting the optical performance. Such limitations may lead to lower quality images. These limitations may be understood in terms of phenomena known as optical aberrations. For lens designs with wide FOV values, it may be particularly difficult to correct certain types of aberrations, such as field curvature, astigmatism, and distortion.

The increased difficulty in designing wide angle zoom lenses may be understood through the design considerations involving the FOV. Aberration correction may be related to FOV, and greater FOV may lead to increased concerns in aberration correction. When the FOV is small, as in telephoto zoom lenses, on-axis and off-axis rays may be close together, and aberration correction may be important mainly along the optical axis of the zoom lens. When the FOV is large, on-axis rays and off-axis rays may be farther apart, and a lens designer would have to consider aberration correction for the relatively farther off-axis rays. Off-axis chromatic aberrations can be also difficult with larger FOV.

When a lens designer actually attempts to make aberration corrections, the lens designer can only alter a certain number of parameters, such as number of lens elements, lens element radius of curvature, lens element thickness, lens element material, zoom lens type, power distributions of the zoom lens, etc. Each parameter may represent a degree of freedom in modifying the zoom lens system in terms of given specifications. However, all the degrees of freedom may not be independent from each other, and design goals may constrain which degrees of freedom that a lens designer can actually modify. As for wide angle zoom lenses, they cover wide FOV to narrower FOV, and the wide and narrow regions have different characteristics regarding aberrations. For example, the exit pupil size between the wide and telephoto ends is different even when having the same F-number. In addition, at wide regions, the incident angle of oblique rays becomes steep which causes residual aberrations such as field curvatures, distortions, and lateral chromatic aberrations. On the other hand, at the telephoto end, the beam size becomes larger than that of at the wide end.

Moreover, when combined with other design goals, such as high-speed and smaller size, the design difficulty could further increase. Designing a wide angle zoom lens to be high-speed would further involve the general design considerations for a high-speed zoom lens and corrections of aberrations caused by oblique rays and lack of symmetry of the layout of the lens configurations. Even further, the high-speed aspect could add complexity to the wide angle zoom lens design considerations. For example, a high-speed zoom lens requires a relatively small F-number (e.g., smaller than 2.8), which may lead to larger marginal ray bundles. A high-speed zoom lens may also involve a relatively large entrance pupil, which may lead to larger oblique ray bundles to achieve better relative illumination fall-off around the corners. Aberration correction for these larger ray bundles requires additional lens elements, aspheric surfaces, or additional movable lens groups to correct aberration characteristics at both the wide and telephoto ends. Such aberration correction is more difficult than for smaller ray bundles. Thus, in combination with the general design difficulties of a wide angle zoom lens, adding the aspect of high-speed would further increase the design challenges for a lens designer.

In addition to optical aberration considerations, designing wide angle zoom lenses may involve other design considerations. For instance, relative illumination fall-off around the corners may be a common concern for wide angle zoom lenses. In such phenomena, there is relative illumination fall-off around the corners of an image (e.g., resulting in darkened corners of an image). In other words, increasing relative illumination at the corners may be challenging for designing high speed wide angle zoom lenses.

Additional Design Considerations

As discussed above, adding design goals may complicate the design considerations and increase the difficulty in providing a lens system that meets all the design goals. For wide angle zoom lenses designed for cinematography applications, some additional design goals may include low focus breathing, convenient usage with a lens shade, and high lens speed. For wide angle zoom lenses designed for digital imaging, an additional design goal may include usage with image sensors.

Design Considerations for Focus Breathing

For low focus breathing, it may be necessary to find a suitable lens power and configuration for focus breathing. Focus breathing may be described in terms of the amount of change in the field of view (or angle of view) as a lens system progresses between the two end focus positions of maximum object distance and minimum object distance:

Focus breathing (%)=$(W_{inf}-W_{min})/W_{inf}$

Field of view at infinity is $W_{inf}$. Field of view at minimum object distance $W_{min}$.

Low focus breathing may be accomplished through various design techniques. Some design techniques may include short travel distances of focusing lens elements that perform focusing and sufficient optical power of focusing lens elements that move.

As discussed above, the FOV may change due to change in the total focal length. Total focal length can change due to the movement of focusing lens elements. If the movement is small, the FOV change may also be small, leading to low focus breathing. In addition, minimal aberration changes during focus may be preferred.

Also, the optical power of focusing lens elements may affect the lengths of travel distances of focusing lens elements. If the optical power of focusing lens elements is weak, then the focusing lens elements may have to travel longer distances in order to achieve a certain amount of focus change. For the same amount of focus change, if the optical power of the focusing lens elements is strong, then the focus lens elements may have to travel shorter distances. However, if the optical power is too strong, then the effect of optical aberrations may become unacceptably high.

It should be noted, however, that short travel distances do not automatically imply appropriate low focus breathing. For example, if a focusing lens element's power is very strong, the aberration changes during focus may be large. Also, focus breathing control may require more than one movable group to cancel out the change of FOV during focusing.

Design Considerations for Lens Shade

For convenient usage with a lens shade, a stationary front element may be a design consideration, as discussed above.

Design Considerations for Lens Speed

For high-speed zoom lenses, design considerations may also be complex.

A high-speed zoom lens may be empirically recognized as having an F-number smaller than 2.8. A common application for such high-speed zoom lenses may be shooting pictures in environment with relatively low illumination using shallower depth of field and may include utilizing relatively a soft effect with lower resolutions. A more technical discussion of lens speed follows.

In general, F-number is defined by the entrance pupil diameter (EPD) and the effective focal length (EFL) at object distance infinity. F-number is a dimensionless number.

$F\text{-number}=EFL/EPD$ (object distance infinity)

When the object is not at a far distance from the lens (i.e., finite object distance), a "working" or "effective" F-number (Fe-number) may be used. Fe-number may be defined by the F-number and the magnification (m) of the lens for an object at finite object distance.

$Fe\text{-number}=(1-m)*F\text{-number}$

Based only on these simple equations, it may appear that designing a high-speed zoom lens would simply involve a low F-number. For instance, a larger aperture leads to increasing lens size, which may lead to a larger entrance pupil diameter (EPD). For a constant effective focal length (EFL), a larger EPD would lead to a smaller F-number and a "faster" lens. However, a real lens has actual real-world parameters, such as lens weight, size, tolerances, and production costs. Increasing EPD may increase the lens weight and size and length, which may lead to the inconveniences of a heavier and larger camera. For instance, hand-held camera operations may become difficult with a heavier lens. Increasing lens size may also lead to higher production costs.

Additionally, a real optical system may be generally bound by optical aberrations. For instance, F-number can be related to aberrations such as spherical aberrations and chromatic aberrations on-axis. When the effective focal length EFL is constant, F-number has a directly inverse relationship to the entrance pupil diameter EPD. A smaller F-number would indicate a larger EPD, which would lead to greater effects of spherical aberration and coma in terms of oblique rays. A smaller F-number may increase the higher-order aberrations, which would need to be corrected with additional means. If the residual transverse aberrations are within a given depth of focus, the optical performance of the lens system may be acceptable with the smaller F-number. Accordingly, modifying an existing zoom lens system to have a smaller F-number (i.e., "faster" lens) may be difficult to achieve without significant effects of optical aberrations, such as spherical aberration and coma within allowable distortions.

Moreover, spherical aberration and coma are two main examples of aberrations affected by aperture. Other types of aberration affected by F-number may include astigmatism and field of curvature because of the certain overall length or size. Efforts to achieve a high-speed lens system may also involve appropriate consideration of these aberrations as well.

Furthermore, although increasing F-number may help correct optical aberrations, it may also increase diffraction. Diffraction is another optical phenomenon that can degrade image quality.

Therefore, a particular lens design of a given lens type may have an optimum F-number (or lens speed or aperture size) that balances the residual aberrations and the effect of diffraction. Accordingly, undue experimentation may be involved when modifying an existing zoom lens system with an original and optimum F-number to have a different F-number. Even with a same zoom lens type, with sufficient considerations for correcting aberrations of each lens group and lens configurations, there may be some solutions to meet the desired specifications (e.g., high image quality such as better bokeh). Therefore, careful consideration of aberration balance and changes during zooming and focusing with the allowable size and weight may be involved in the design of a high-speed zoom lens. Corrective measures such as zoom and focus types, glass materials, and aspheric surfaces may be available to counter some of these effects, but such corrective measures may be too costly or impractical if the amounts of these effects are too great.

Some of these image degrading phenomena may be quantified in equations that describe different types of aberration coefficients with transverse aberrations. Examples of such equations may be found in known references, such as *Fundamentals of Practical Aberration Theory: Fundamental Knowledge and Technics for Optical Designers* by Y. Matsui et al., which is herein incorporated by reference in its entirety for all purposes.

For instance, as F-number=EFL/EPD, a smaller F-number may have a larger EPD. A larger EPD is correlated to a larger paraxial marginal ray height h. According to transverse aberration equations, a larger h value could lead to greater effects of spherical aberration and coma. In addition, astigmatism, field of curvature, and distortions are affected with the increase on the ray bundle size and with restriction of overall length. Such understandings are based on aberration theory. Therefore, properly designing a high-speed zoom lens would involve appropriate consideration of the image-degrading effects of these aberrations.

Design Considerations for Digital Imaging

For digital imaging, an additional design consideration may include usage with image sensors. Exit pupil distance, which may be defined from the imager surface to the exit pupil position, may be one notable aspect in designing a zoom lens for usage with image sensors. If the distance from the exit pupil to the image sensor is long, light incident to the image sensor has an angle of incidence that may be small or even parallel to the optical axis. If the exit pupil distance is short, the angle of incidence may be large. An image sensor generally produces a stronger signal when the angle of incidence is small with the combination of microlens off-set design. If the angle of incidence is too high, the image sensor may produce a weaker signal around the corner areas of the imager, resulting in a darkened portion in the image. In a zoom lens design for usage with an image sensor, the angle of incidence for incident light on the image sensor is generally higher along the periphery, resulting in relative illumination falloff around the corners of the image, also known as pixel vignetting. Thus, a lens design for digital imaging may implement a long exit pupil distance to reduce this vignetting effect.

Prior Lens Design Efforts

In view of prior wide angle zoom lens designs, some optical performance issues have been identified, such as poor corner illumination, large negative distortion, and field curvature at wide angles with lower MTF (modulation transfer function) values at image corners. Prior wide angle zoom lens designs are known, but they may not be suitable to address these optical performance issues and the different possible combinations of considerations disclosed above.

Wide angle zoom lenses with a N-lead lens group are known, so it may be possible for a lens designer to try to design a wide angle zoom lens by starting with a lens design having a N-lead lens group. However, even from such a starting point, a lens designer cannot simply arbitrarily add any desired modification. In the field of zoom lens systems, it is generally understood that a functional system is a complex combination of many interrelated variables (e.g., optical power, lens position, lens movement, lens size, lens thickness, lens material, number of lens elements, lens surface shaping). Changes in one of the variables generally alter the functioning of the original system (e.g., zoom operation). In order to maintain a system that functions appropriately (e.g., according to the principles of the original zoom design), changes in one of the variables generally lead to compensating changes in one or more of the other variables.

Accordingly, experimentation with any variables to incorporate the teachings of a first zoom lens system into a second zoom lens system could lead to other unintended adverse effects in the second zoom lens system. Such adverse effects may result in changing the fundamental operation of the second zoom lens system.

A prior design technique for a wide angle zoom lens may include a movable first (i.e., lead) lens group with negative power. This N-lead lens group may move non-monotonically and help control the location of the image. However, such a technique may be undesirable for use with a lens shade, as discussed above.

Another prior technique for a wide angle zoom lens may include a lens design with five or more movable lens groups. Allowing a lens group to be movable may increase the degree of freedom that a lens designer may have in adjusting system variables to achieve a desired optical performance. However, more movable lens groups may introduce additional concerns. For instance, a movable lens group is generally more prone to failure than a stationary lens group because it involves moving parts, which may malfunction or break due to wear and tear from repetitive motion. Also, there may be wide range of possible movement plans for a movable lens group, so a lens designer may have to use significant amounts of time and experimentation to determine a suitable movement plan for the movable lens group.

Yet another prior technique for a wide angle zoom lens may include the use of two or more aspheres to achieve downsizing. Aspheres are lens elements with aspheric surfaces. Aspheres may be useful for correcting optical aberrations, but an asphere can be more expensive to produce than an ordinary spherical lens element. Also, each asphere's surface can be quite complex, so properly coordinating the effect of multiple aspheres may also be complex (e.g., proper alignment may be more difficult and require costly alignment equipment). For lens designs that have low speed and are not wide angle, an asphere may not be necessary. For lens designs that have high speed and are wide angle, which may cover over 80 degrees, however, two or more aspheres may be necessary to keep the size compact; it may be difficult to achieve suitable optical performance with less than two aspheres in terms of the considerations of accuracy and manufacturability.

For relative illumination, it is theoretically possible to improve corner illumination by increasing the size of the last lens group before the image plane or by adding additional lens elements for ray bundles to pass through the corners of the image plane to increase the intensity with more ray bundles. However, increasing the corner illumination may affect the system weight, size, and cost. Additionally, there may be size constraints due to mounting constraints. That is, in practice, an actual lens will generally be mounted to an actual lens mount of a camera, even if there is a digital camera that has no restriction of a mirror or a beam splitter of an optical viewfinder. Thus, a lens design may be constrained by the specific size dimensions of the lens mount. Therefore, arbitrarily increasing the size of the last lens element or last lens group may be impractical and undesirable.

Exemplary Principles of Embodiments of the Invention

Embodiments of the invention relate to zoom lens systems, such as wide angle zoom lens systems and even high-speed wide angle zoom lens systems. Embodiments of this zoom lens system may be particularly advantageous for image capture devices in cinematography applications. However, embodiments of the invention are not limited to this usage in cinematography. For example, other usages may include capturing still images and non-cinematographic applications.

Examples of practical implementations may include wide angle zoom lenses and super wide angle zoom lenses for film and digital cinematography and photography, wide angle macro zoom lenses, infrared (IR) zoom lenses, space optics, and projection zoom lens. Even further, another practical implementation may even include non-wide angle zoom lenses.

Basic Structure of Lens Groups

FIG. 1A illustrates some principles of embodiments of the invention through system 100. System 100 may include five lens groups: lens group 110 with negative power, lens group 120 with positive power, lens group 130 with negative power, lens group 140 with positive power, and lens group 150. In some embodiments, lens group 150 may be positive. In such embodiments, from the object side to the image side, the power sequence of these five lens groups 110, 120, 130, 140, and 150 may be described as NPNPP. In other embodiments, lens group 150 may be negative, and the corresponding power sequence may be described as NPNPN.

Figure 1B:
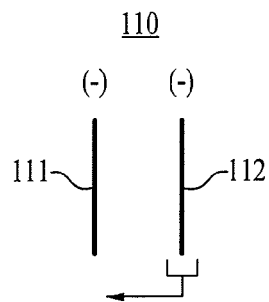

FIG. 1B illustrates that lens group 110 of FIG. 1A may comprise two negative lens subgroups 111 and 112. From the object side to the image side, the power sequence of the two lens subgroups may be described as NN. The combined power of the two lens subgroups may be negative.

The overall length of the zoom lens system 100 may be constant during zoom and focus movements of its lens groups.

The teachings of FIGS. 1A-1B may be embodied in wide angle zoom lenses and in non-wide angle zoom lenses.

Zoom Movement

During zooming, lens group 110 may be stationary, and lens groups 120, 130, 140, and 150 may be movable. When first lens group 110 is stationary, the other lens groups 120, 130, 140, and 150 may move during zoom to vary the image magnification, to vary the effective focal length, and to keep the image plane in its correct position.

Movement plan lines 125, 135, 145, and 155 are intended to broadly indicate any suitable zoom movement plan for lens groups 120, 130, 140, and 150, respectively. Movement plan line 125 indicates that the movement of lens group 120 may be monotonic. For example, from the wide (W) position to the tele (T) position, any movement of lens group 120 is toward the object side, and vice versa. Movement plan line 145 indicates that the movement of lens group 140 may also be monotonic in the same direction as the movement of lens group 120; from the wide (W) position to the tele (T) position, any movement of lens group 140 is toward the object side, and vice versa. Movement plan lines 125 and 145 are not intended to show the specific movement details (e.g., exact movement rates, exact position during movement) of lens groups 120 and 140, respectively, but relative position during zooming is designed with paraxial optical design principles.

Movement plan lines 125 and 145 indicate that the movements of lens groups 120 and 140 may be monotonic in the same direction. In some embodiments, the movements of lens groups 120 and 140 may have differing movement plans. In other embodiments, they may have matching movement plans, as indicated by reference character 165 for matching movement plans or linked zoom movement. A lens design embodiment with such matching movement plans may be mechanically simpler to physically implement and less costly to produce. However, a lens designer would generally understand that arranging multiple lens groups to have such matching movement plans would constitute a design constraint that may be difficult to maintain while achieving suitable optical performance of the final lens design. The difficulty may be so great that maintaining this design constraint could involve undue experimentation. Nonetheless, example embodiments disclosed below successfully include matching movement plans for lens groups corresponding to lens groups 120 and 140.

Movement plan line 135 indicates that the movement of lens group 130 may be non-monotonic. For example, from the wide (W) position to the tele (T) position, lens group 130 may move toward the object side up to a turning point and then move toward the image side, and vice versa. Movement plan line 155 indicates that the movement of lens group 150 may also be non-monotonic, but different from the movement of lens group 130. For example, from the wide (W) position to the tele (T) position, lens group 150 (as positive or negative) may move toward the image side up to a turning point and then may move toward the object side, and vice versa. Movement plan lines 135 and 155 are not intended to show the specific movement details (e.g., exact movement rates, exact position during movement) of lens groups 135 and 155, respectively, but relative position during zooming is designed with paraxial optical design principles.

It should be noted that the lens design exemplified in FIG. 1A is versatile enough to accommodate the same general movement plan for embodiments where lens group 150 is positive and for embodiments where lens group 150 is negative, as indicated by movement plan line 155. For instance, from the wide (W) position to the tele (T) position, lens group 150 (as positive or negative) may move toward the image side up to a turning point and then move toward the object side, and vice versa. Modifying a lens design by changing the power of a lens group can be a drastic modification that requires compensating adjustments in other system variables, such as adjusting the power values of other lens groups and adjusting the movement plan of the modified lens group. Nonetheless, example embodiments disclosed below successfully employ the same general movement plan for lens group 150 as positive or negative.

The locations of lens groups 110, 120, 130, 140, and 150 in FIG. 1A are intended to visually show the general order of the lens groups from object space to image space. The locations in FIG. 1A are not intended to specifically indicate the exact positional locations of lens groups 110, 120, 130, 140, and 150 with respect to each other. Also, FIG. 1A visually shows changes between the locations of lens groups 120, 130, 140, and 150 at the wide (W) position and the locations of lens groups 120, 130, 140, and 150 at the tele (T) position. (FIG. 1A shows lens group 110 as stationary.) However, these changes between the locations of these lens groups at the wide (W) position and the locations of these lens groups at the tele (T) position are not intended to specifically indicate the exact changes in locations of lens groups 120, 130, 140, and 150. Following examples show specific embodiments with more detailed information, such as exact locations of lens groups and exact changes in locations of lens groups according to different zoom positions. In other words, FIG. 1A is a schematic design of a conceptual design of an embodiment.

Field Flattener

Lens group 150 can operate as a field flattener to flatten the image and compensate for field curvatures. Lens group 150 may include a singlet or multiple lens elements. Lens group 150 may be movable, and it may work like a field flattener group during zoom. Due to the movement of lens group 150, system 100 may correct field curvatures quite well and attain field flat images throughout the different zoom positions.

Focusing

The focus function and the zoom function may be independent from each other. For instance, any movement of lens elements for focusing may be independent of any movement of lens elements for zooming. For a specific example, one or more lens elements of lens group 110 may move to adjust the focus while the zoom does not change. Similarly, lens elements of lens groups 120, 130, 140, and 150 may move to adjust the zoom while the focus does not change.

FIG. 1B illustrates a movement plan for focusing by lens group 110 of FIG. 1A comprising two negative lens subgroups 111 and 112. FIG. 1B shows the lens subgroups in the focus position of object distance at infinity.

First lens subgroup 111 may be stationary during zooming and focusing. In embodiments where the first lens subgroup is at the front of the zoom lens system, the overall length of the zoom lens system 100 may be constant, even during zooming and focusing. As the front lens element may be stationary, one may understand the focusing as a type of internal focusing.

In some embodiments, all the lens elements of first lens subgroup 111 may have negative power. In other embodiments, the front lens element of first lens subgroup 111 may have positive power.

The second lens subgroup 112 may be movable during focusing. During progression from the end focus position of object distance at infinity to the other end focus position of minimum object distance, lens subgroup 112 may move monotonically toward the object side.

Embodiments with the focus movement plan of FIG. 1B may be well-suited for applications with lens shades due to a stationary first lens subgroup. In embodiments where the stationary first lens subgroup includes a stationary front lens element, the overall length of the zoom lens system 100 may be constant, even during zooming and focusing. Therefore, using such a lens system may involve fewer or no adjustments of a lens shade size and/or position.

Embodiments with the focus movement plan of FIG. 1B may also be well-suited for applications where focus breathing is a significant concern. Focus breathing may be described in terms of the amount of change in the field of view (or angle of view) as a lens system progresses between the two end focus positions of maximum object distance and minimum object distance:

Focus breathing (%)=$(W_{inf}-W_{min})/W_{inf}$

Field of view at infinity is $W_{inf}$. Field of view at minimum object distance is $W_{min}$. Some embodiments may achieve 5% or less change (positive or negative) in the field of view.

Low focus breathing may be accomplished through various techniques. Some techniques employed in embodiments with the focus movement plan of FIG. 1B may include short travel distances of lens subgroup 112 in lens group 110 and sufficient optical power of moving lens elements of lens subgroup 112.

As discussed above, the field of view (FOV) may change due to change in the total focal length. Total focal length can change due to the movement of focusing lens elements. If the movement is small, the FOV change may also be small. Embodiments with the focus movement plan of FIG. 1B may include short travel distances of lens subgroup 112 in lens group 110 to contribute to low focus breathing.

Also, the optical power of focusing lens elements may affect the lengths of travel distances of focusing lens elements. If the optical power of focusing lens elements is weak, then the focusing lens elements may have to travel longer distances in order to achieve a certain amount of focus change. For the same amount of focus change, if the optical power of the focusing lens elements is strong, then the focus lens elements may have to travel shorter distances. However, if the optical power is too strong, then the effect of aberration changes may become unacceptably high. Embodiments with the focus movement plan of FIG. 1B may include moving lens elements with sufficient optical power to contribute to shorter travel distances, thus contributing to low focus breathing. For example, the second lens subgroup 112 may have suitably strong optical power.

It should be noted, however, that short travel distances do not automatically imply low focus breathing. For example, if a focusing lens element's power is very strong, the FOV change may be large even for a short travel distance. In other words, it may be required to find a solution to control focus breathing with smaller aberration changes during focusing.

Asphere

In some embodiments, a lens element of first lens subgroup 111 may include an aspheric surface to correct mainly distortions, especially at the wide end. The aspheric surface may be convex or concave and can correct minus percent distortions within this application(s). An aspheric surface has some departure from its best fit sphere. Greater departure generally leads to increased difficulty and cost in production due to fabrication and metrology. Regarding an asphere in lens subgroup 111, some embodiments may include a positive lens element in lens subgroup 111, which may be effective in reducing the asphere's departure from its best fit sphere.

In some embodiments, the front lens element of first lens subgroup 111 may have positive power. Such a positive front lens element can correct negative distortion fairly well, and the aspheric sag from the best fit sphere can be decreased near the clear aperture, where the ray bundles pass through to the corners at wide regions. In other words, the off-axial rays dictate the aspheric sag near the wide end.

Unlike other conventional zoom lens designs that use many aspheric surfaces, various embodiments of the invention may employ only a single convex or concave aspheric surface. Modifying a conventional zoom lens design to use fewer aspheric surfaces may be non-trivial and require significant experimentation to even investigate the possibility of doing so. Additionally, while it may be possible to attempt modifying a known zoom lens design to use fewer aspheres, two or more aspheres may still be necessary to achieve a modified lens design with acceptable optical performance that is high-speed and wide angle at its wide end. Moreover, determining the appropriate location of an asphere in a lens design may also be non-trivial and involve further experimentation.

Exit Pupil Distance

Various embodiments may have a relatively long exit pupil distance. For instance, the exit pupil distance in embodiments may be generally longer than NP zoom lenses or NPNP zoom lenses.

Additional Aspects of Embodiments of the Invention

For cinematography applications, various embodiments may also address additional concerns, as in the following exemplary aspects of embodiments of the invention. The zoom lens may be wide angle to accommodate wide FOV values. The F-number may be constant from the wide-end to the telephoto-end. The zoom lens may be high-speed (e.g., F-number less than 2.8). In a portable (e.g., hand-held) camera embodiment with a matte box, the constant overall length of zoom lens system 100 may operate well with lens shades. Moreover, various embodiments may address focus breathing concerns, such as having 5% or less focus breathing. Furthermore, embodiments with suitably long exit pupil distances may be used with image sensors for digital imaging. Embodiments of the invention may address any combination of one or more of these exemplary considerations.

Various embodiments may operate with different focal lengths. A following example shows a minimum focal length of 12.02 mm, but other embodiments may include a minimum focal length less than 12.02 mm. A following example shows a maximum focal length of 75.08 mm, but other embodiments may include a maximum focal length greater than 75.08 mm. Minimum object distance from image surface may be around two feet or shorter. Variations may have a zoom ratio of about 2 to 3 times magnification. As the zoom ratio decreases (e.g., zoom ratio of 1.5×-2×), the movement plan of lens group 130 may be monotonic. For example, when the zoom ratio is 1.5×-2×, from the wide (W) position to the tele (T) position, any movement of lens group 130 may be toward the object side, and vice versa.

Various embodiments may employ different lens element configurations, as exemplified by the following embodiments in FIGS. 2A, 3A, 4A, 5A, and 6A. Moreover, embodiments of the invention are not limited to these specific lens element configurations. For instance, instead of a cemented doublet, a suitable combination of one or more of the following may be used: an air-spaced doublet, a singlet, and a set of multiple lens elements. A suitable combination would maintain appropriate functioning of the original embodiment (e.g., according to principles of the original zoom design).

Although many of the technical details above are mostly described in the context of cinematography applications, the technical details may also be advantageous in ways that are independent of cinematographic considerations.

For example, independent of the use of a lens shade, there may be other advantages for employing a fixed front lens group. For instance, a stationary first lens group may contribute to a lens system with a fixed system length. Such a lens system could be housed in a housing structure with a fixed length, which could be more stable and protective than a housing structure with a variable length.

Example Embodiments

For each following example embodiment, a representative figure provides a visual depiction of a zoom lens system. For zoom positions, the wide-end (W) position, three intermediate positions, and the telephoto-end (T) position are shown. Also, the representative figure shows the focus position of object distance at infinity.

For each following example embodiment, a table provides lens data in five columns. A row in the first column ("Surface") identifies a surface (e.g. lens element surface, stop). A row in the second column ("Radius of Curvature (mm)") provides the radius of a surface in mm. A row in the third column ("Thickness or Separation (mm)") provides the thickness, whether lens material or air, on the optical axis between the surface of that row and the next surface in mm. A row in the fourth column ("Ne") provides the refractive index of lens element material at the e-line (wavelength=546.1 nm). A row in the fifth column ("Ve") provides the Abbe number of lens element material at the e-line.

In the first column ("Surface"), the numbers represent the surfaces ordered from left-to-right in the representative figures of the example embodiments, i.e., from object side to image side. When two surfaces of adjacent elements have the same radius and are coincident, as in a cemented doublet, only one surface is identified in the first ("Surface") column. Also, in the "Surface" column, "STO" identifies an adjustable iris or aperture stop.

In the third column ("Thickness or Separation (mm)"), the term "D(_____)" indicates distance between surfaces that may be variable for different zoom positions. For each lens data table, there is a zoom position table that provides the different separation distances for different zoom positions according to different focal lengths.

In all of the lens data tables, all of the lens element surfaces are spherical, except for those surfaces designated as aspheric.

Additionally, aberration graphs are provided for each following example embodiment. These graphs indicate the effects of some aberrations, including longitudinal spherical aberration, astigmatism of sagittal and meridional curvatures, and distortion.

In the longitudinal spherical aberration graphs, the horizontal axis represents focus deviation in mm, and the vertical axis represents ray height in the entrance pupil. In the following longitudinal spherical aberration graphs, the e-line is shown.

In the astigmatism graphs, the horizontal axis represents focus deviation in mm, and the vertical axis represents field angle. In the following astigmatism graphs, both the sagittal and meridional curves at the e-line are shown.

In the distortion graphs, the horizontal axis represents percentage distortion, and the vertical axis represents field angle. In the following distortion graphs, the e-line is shown.

Furthermore, a set of bar graphs are provided for showing information about the third-order astigmatism aberration coefficient in each embodiment. Each bar graph shows third-order astigmatism aberration coefficient data for each lens group and the total sum for an embodiment at a given focal length. In order from left to right, the third-order astigmatism aberration coefficient is shown for a first lens group, a second lens group, a third lens group, a fourth lens group, a fifth lens group, and the overall sum for the embodiment. Each set of bar graphs shows five zoom points from wide end to telephoto end.

The third-order astigmatism aberration of each lens group indicates its field flatness contribution to the total field flatness of the whole embodiment. In the following example embodiments: the first lens group has quite a small effect on the field flatness, the second lens group has a large negative amount throughout the zoom range, the third lens group provides a relatively large positive amount, the fourth lens group changes from positive to negative during zoom from wide end to telephoto end, and the fifth lens group generally provides a positive amount. During zoom from wide end to telephoto end, the fifth lens group's amount changes due to the zoom motion of the fifth lens group. The contribution of the fifth lens group keeps the total sum low. As a result, there is good total field flatness in the following example embodiments. In other words, good flat field zoom lenses are attainable through these teachings.

Additionally, the contribution of the fifth lens group is not limited to positive amounts. It can also be a negative amount, as indicated by the negative amount in the example third embodiment at f=75.08 mm in FIG. 4E.

Example First Embodiment

Figure 2A:
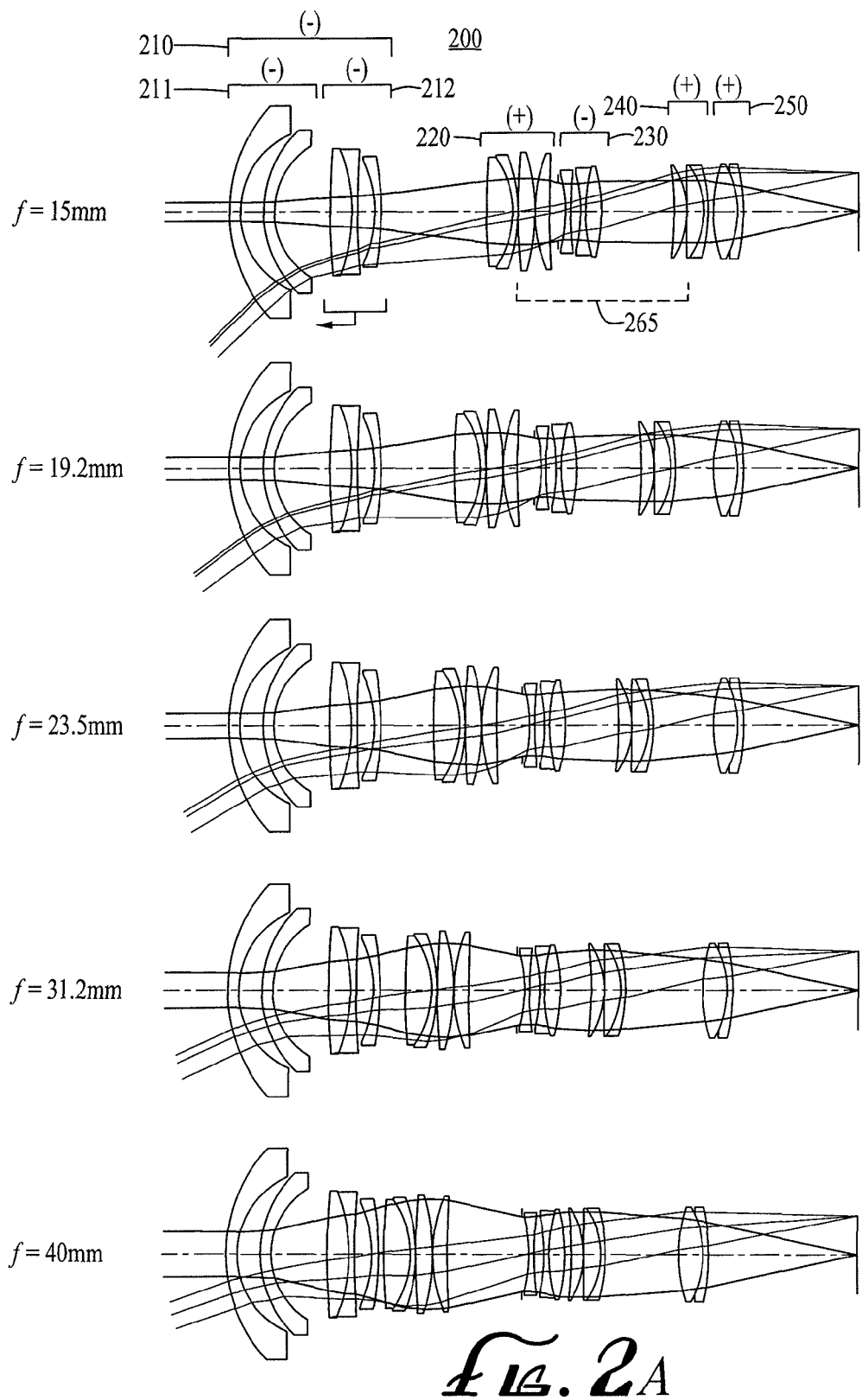
FIG. 2A illustrates a first embodiment.

FIG. 2A illustrates a first embodiment 200. From the wide-end (W) to the telephoto-end (T), the focal length ranges from 15 mm to 40 mm. The field of view is from 88.6 degrees to 39.4 degrees. The F-number is F/2.4. The exit pupil distance is from −1073.26 mm to −132.02 mm.

FIG. 2A shows five lens groups 210, 220, 230, 240, and 250 with a NPNPP power sequence. Lens group 210 includes two lens subgroups 211 and 212 with a NN power sequence. First embodiment 200 has one asphere at a concave surface of a lens element in lens subgroup 211. All the lens elements of lens subgroup 211 are negative. Similar reference numbers in FIGS. 2A and 1A-1B refer to similar items.

Zoom movements for first embodiment 200 exemplify the general movement plan shown for system 100 in FIG. 1A. Lens group 210 may be stationary with respect to zooming. From the wide (W) position (f=15 mm) to the tele (T) position (f=40 mm), lens groups 220 and 240 move toward the object side according to matching movement plans, as indicated by reference character 265. In between f=23.5 mm and f=40 mm, lens group 230 moves toward the object side up to a turning point and then moves toward the image side. In between f=15 mm and f=23.5 mm, lens group 250 moves toward the image side up to a turning point and then moves toward the object side.

Focusing for first embodiment 200 exemplifies the general movement plan shown for lens group 110 in FIG. 1B. Lens subgroup 211 may be stationary during zooming and focusing. Lens subgroup 212 is shown at the focus position of object distance at infinity. Lens subgroup 212 may be movable for internal focusing within lens group 210. During progression from the end focus position of object distance at infinity to the other end focus position of minimum object distance, lens subgroup 212 may move monotonically toward the object side.

TABLE 1A provides lens data for first embodiment 200. TABLE 1B provides the various zoom positions of the wide-end zoom position, three intermediate zoom positions, and the telephoto-end zoom position at five respective focal lengths (mm): 15, 19.2, 23.5, 31.2, and 40.

TABLE 1A

FIRST EMBODIMENT - LENS DATA

| Surface | Radius of Curvature (mm) | Thickness or Separation (mm) | Ne | Ve |
|---|---|---|---|---|
| 1: | 60.25900 | 3.77000 | 1.73234 | 54.4 |
| 2: | 31.46762 | 8.78100 | | |
| 3: | 41.85800 | 3.67000 | 1.81078 | 40.7 |
| 4 (aspheric): | 22.87423 | 20.89100 | | |
| 5: | 235.92100 | 8.08000 | 1.62409 | 36.01 |
| 6: | −62.40200 | 2.35000 | 1.48915 | 70.1 |
| 7: | 500.81996 | 6.07700 | | |
| 8: | −45.51900 | 2.27000 | 1.79196 | 47.1 |
| 9: | −117.52200 | D(9) | | |
| 10: | 226.20500 | 9.30000 | 1.62033 | 63 |
| 11: | −37.00800 | 2.14000 | 1.85650 | 31.93 |
| 12: | −59.76409 | 0.16200 | | |
| 13: | 274.29800 | 6.10000 | 1.48915 | 70.1 |
| 14: | −79.21900 | 0.16000 | | |
| 15: | 55.90700 | 5.67000 | 1.49845 | 81.0 |
| 16: | 704.24900 | D(16) | | |
| STO: | INFINITY | 2.80500 | | |
| 18: | −54.03000 | 1.58000 | 1.83945 | 42.5 |
| 19: | 123.77300 | 3.85663 | | |
| 20: | −64.11300 | 1.61000 | 1.82017 | 46.4 |
| 21: | 65.74500 | 5.85000 | 1.85504 | 23.59 |
| 22: | −63.72700 | D(22) | | |
| 23: | −99.01800 | 4.40000 | 1.48915 | 70.1 |
| 24: | −35.99200 | 0.18500 | | |
| 25: | 1280.06100 | 6.15000 | 1.49845 | 81.0 |
| 26: | −32.67643 | 1.63000 | 1.85504 | 23.59 |
| 27: | −68.62400 | D(27) | | |
| 28: | 56.99600 | 8.48000 | 1.49845 | 81.0 |
| 29: | −39.95500 | 0.70700 | | |
| 30: | −39.95500 | 1.75500 | 1.8565 | 31.93 |
| 31: | −88.36455 | | | |

Aspheric Coefficients
Surface 4:
K = −1.432875
A = 0.767040E−05
B = −0.363667E−08
C = 0.563571E−11
D = −0.761539E−14

TABLE 1B

FIRST EMBODIMENT - ZOOM POSITIONS

| f(mm) = Location | Wide (W) 15 | Intermediate-wide 19.2 | Intermediate-middle 23.5 | Intermediate-tele 31.2 | Telephoto (T) 40 |
|---|---|---|---|---|---|
| | | | Separation (mm) | | |
| D(9) | 39.71275 | 27.69345 | 19.17000 | 9.28054 | 2.02694 |
| D(16) | 2.82220 | 6.02012 | 10.1828 | 18.34160 | 27.77000 |
| D(22) | 27.21450 | 24.01630 | 19.85050 | 11.69460 | 2.27000 |
| D(27) | 2.0000 | 14.45130 | 22.40660 | 28.61540 | 27.27310 |

Figure 2B:
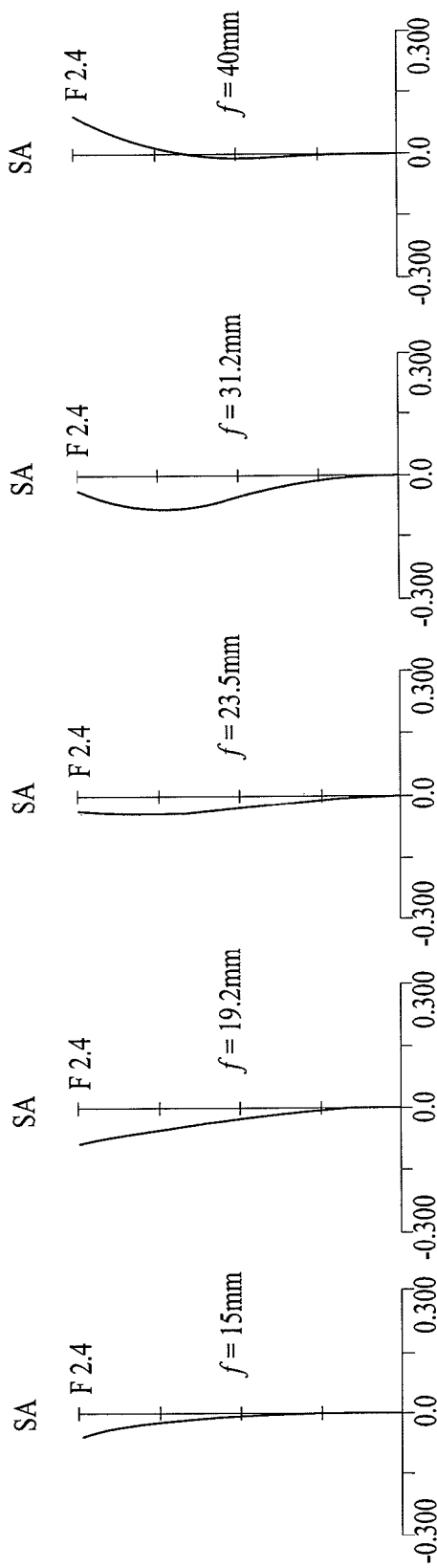
FIGS. 2B-2D illustrate aberration graphs of the first embodiment.
Figure 2C:
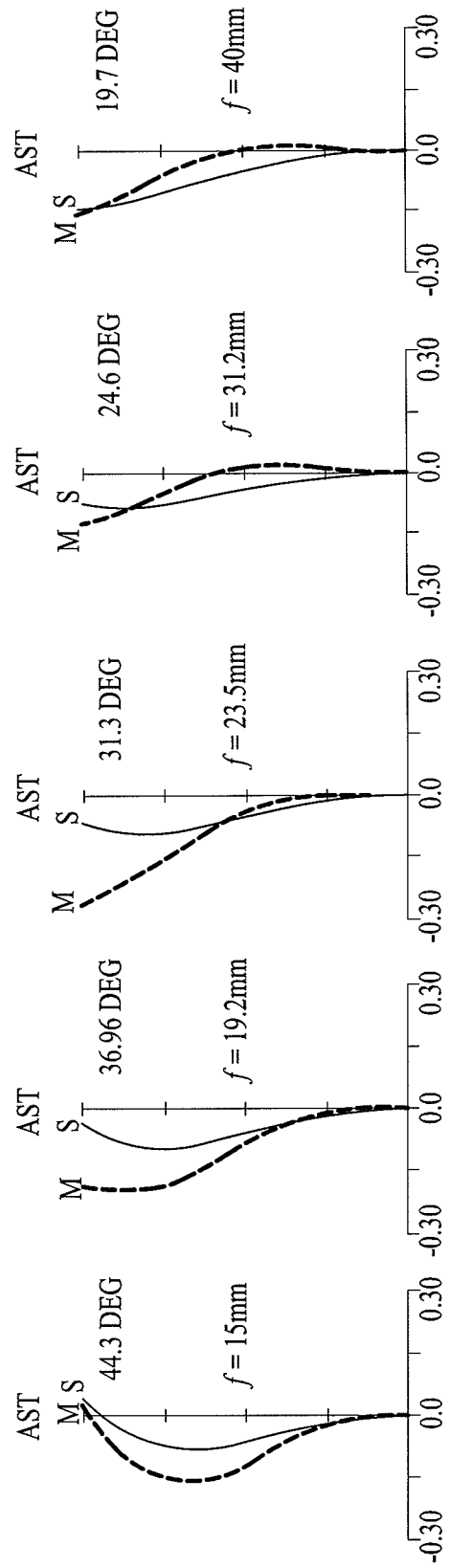
Figure 2D:
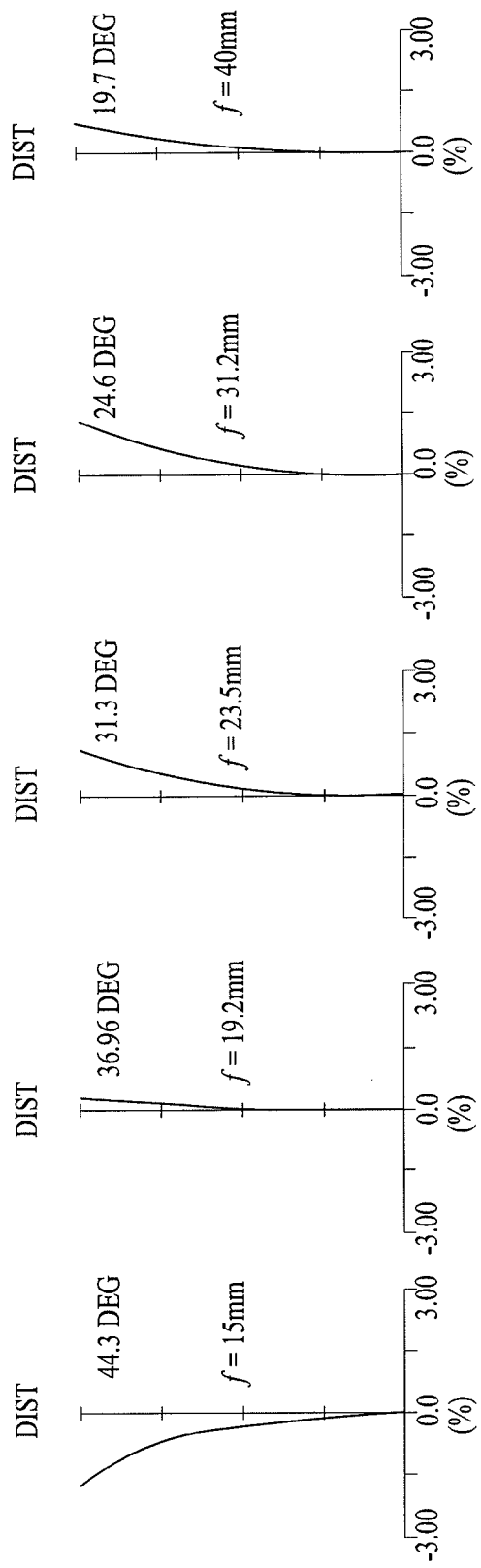

FIGS. 2B-2D illustrate aberration graphs of the first embodiment. The object distance is at infinity for all FIGS. 2B-2D. According to different focal lengths, FIGS. 2B, 2C, and 2D respectively show spherical aberration, astigmatism, and distortion.

Figure 2E:
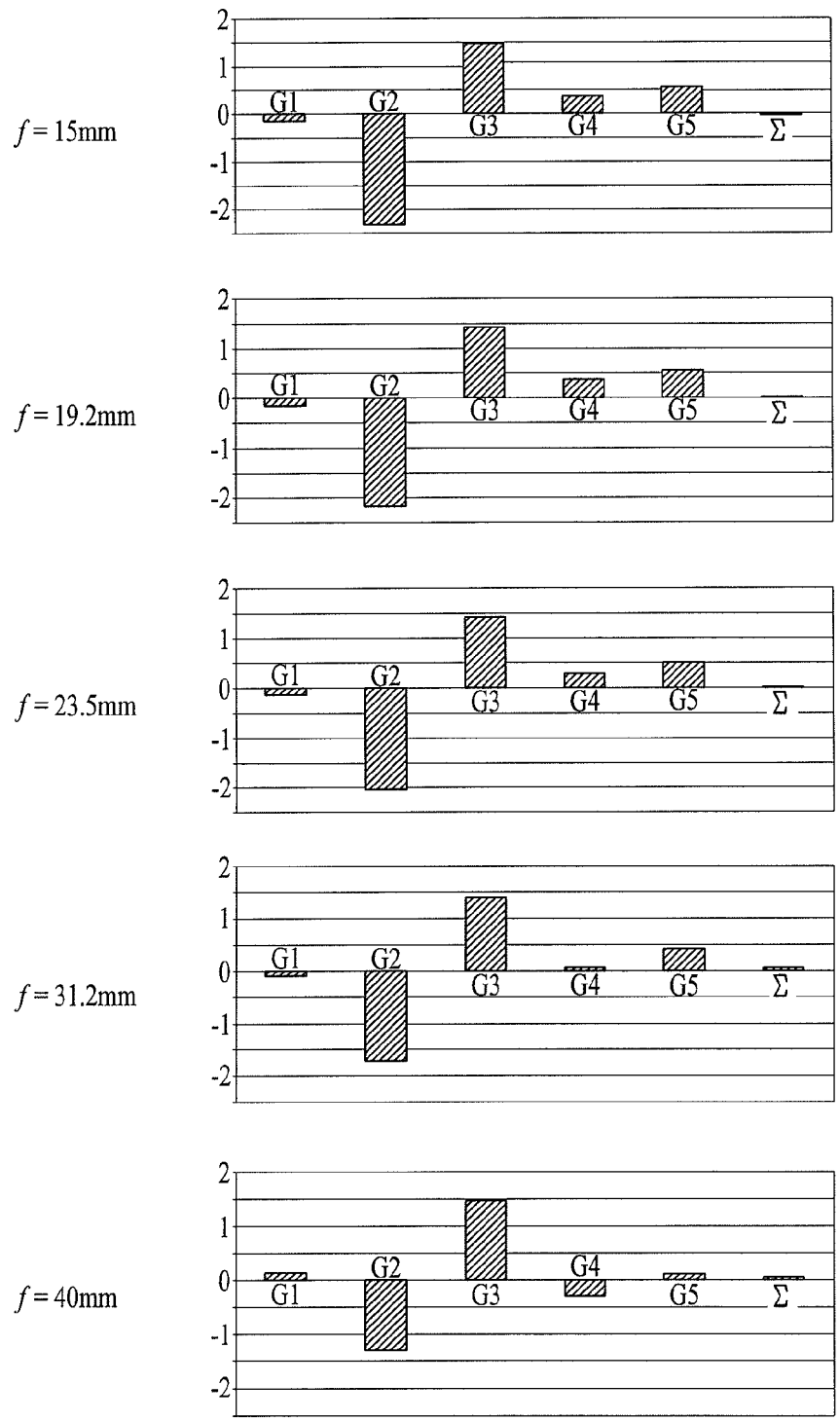
FIG. 2E illustrates third-order astigmatism aberration coefficient data for the first embodiment.

FIG. 2E illustrates a set of bar graphs showing third-order astigmatism aberration coefficient data for the first embodiment.

Example Second Embodiment

Figure 3A:
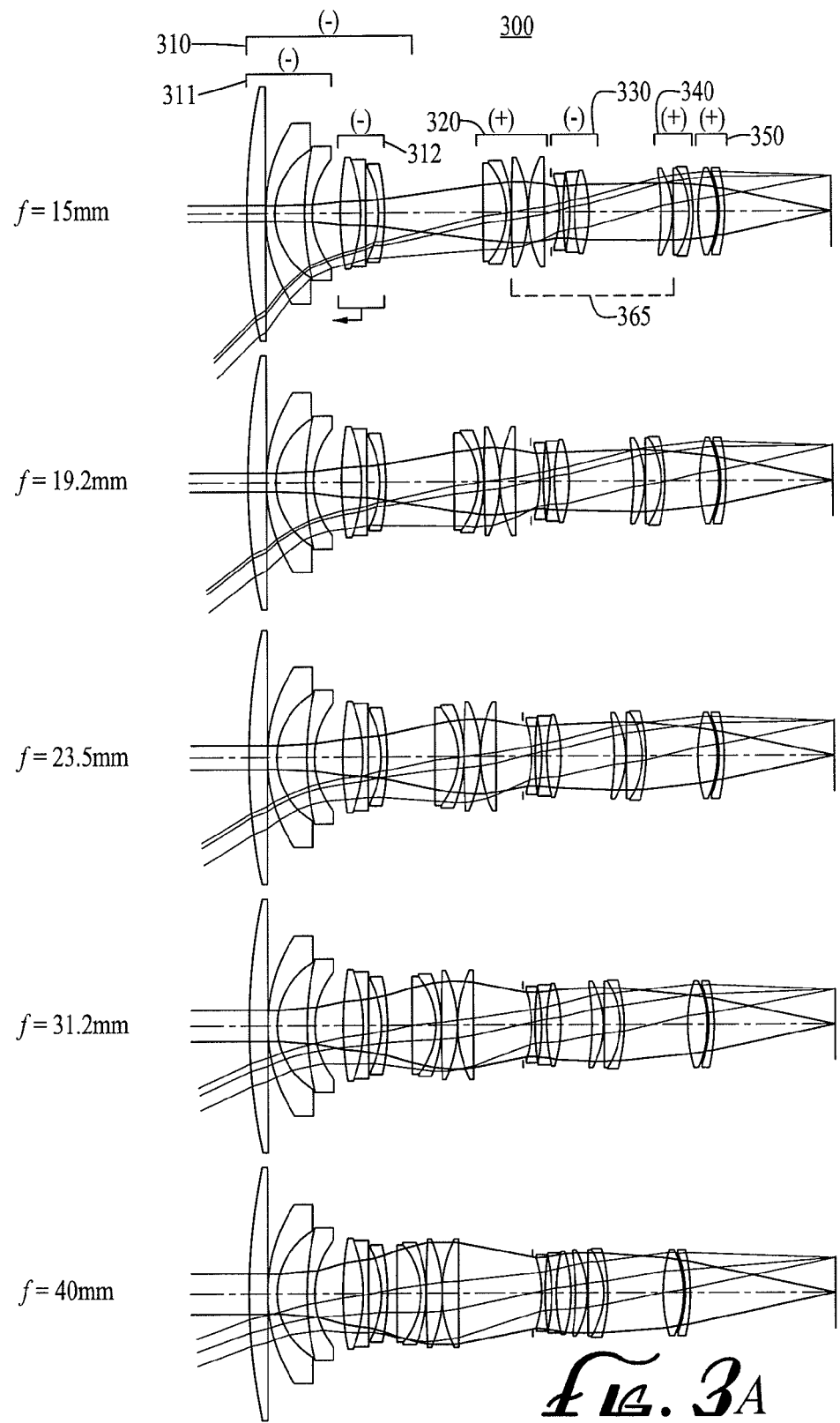
FIG. 3A illustrates a second embodiment.

FIG. 3A illustrates a second embodiment 300. From the wide-end (W) to the telephoto-end (T), the focal length ranges from 15 mm to 40 mm. The field of view is 88.74 degrees to 39.67 degrees. The F-number is F/2.4. The exit pupil distance is from −1271.79 mm to −104 mm.

FIG. 3A shows five lens groups 310, 320, 330, 340, and 350 with a NPNPP power sequence. Lens group 310 includes two lens subgroups 311 and 312 with a NN power sequence. Second embodiment 300 has one asphere at a convex surface of a lens element in lens subgroup 311. The front lens element of lens group 310 is positive. Similar reference numbers in FIGS. 3A and 1A-1B refer to similar items.

Zoom movements for second embodiment 300 exemplify the general movement plan shown for system 100 in FIG. 1A. Lens group 310 may be stationary with respect to zooming. From the wide (W) position (f=15 mm) to the tele (T) position (f=40 mm), lens groups 320 and 340 move toward the object side according to matching movement plans, as indicated by reference character 365. In between f=23.5 mm and f=40 mm, lens group 330 moves toward the object side up to a turning point and then moves toward the image side. In between f=15 mm and f=23.5 mm, lens group 350 moves toward the image side up to a turning point and then moves toward the object side.

Focusing for second embodiment 300 exemplifies the general movement plan shown for lens group 110 in FIG. 1B. Lens subgroup 311 may be stationary during zooming and focusing. Lens subgroup 312 is shown at the focus position of object distance at infinity. Lens subgroup 312 may be movable for internal focusing within lens group 310. During progression from the end focus position of object distance at infinity to the other end focus position of minimum object distance, lens subgroup 312 may move monotonically toward the object side.

TABLE 2A provides lens data for the second embodiment. TABLE 2B provides the various zoom positions of the wide-end zoom position, three intermediate zoom positions, and the telephoto-end zoom position at five respective focal lengths (mm): 15, 19.2, 23.5, 31.2, and 40.

TABLE 2A

SECOND EMBODIMENT - LENS DATA

| Surface | Radius of Curvature (mm) | Thickness or Separation (mm) | Ne | Ve |
|---|---|---|---|---|
| 1: | 287.68700 | 7.150000 | 1.53430 | 48.50 |
| 2: | INFINITY | 0.300000 | | |
| 3 (aspheric): | 96.98046 | 3.770000 | 1.73234 | 54.40 |
| 4: | 30.90524 | 12.070000 | | |
| 5: | 118.74600 | 3.400000 | 1.80811 | 46.30 |
| 6: | 37.00600 | 11.634600 | | |
| 7: | 153.03400 | 7.920000 | 1.65222 | 33.50 |
| 8: | −69.96600 | 2.250000 | 1.48915 | 70.10 |
| 9: | 801.26400 | 5.677000 | | |
| 10: | −39.20000 | 2.210000 | 1.71615 | 53.60 |
| 11: | −117.40149 | D(11) | | |
| 12: | INFINITY | 9.400000 | 1.62033 | 63.00 |
| 13: | −32.27400 | 2.170000 | 1.85649 | 32.03 |
| 14: | −57.47500 | 0.150000 | | |
| 15: | 569.34900 | 6.680000 | 1.48915 | 70.10 |
| 16: | −56.48800 | 0.150000 | | |
| 17: | 55.67800 | 6.390000 | 1.49845 | 81.00 |
| 18: | −3013.37000 | D(18) | | |
| STO: | INFINITY | 3.477000 | | |
| 20: | −54.21300 | 1.600000 | 1.88815 | 40.50 |
| 21: | 189.54700 | 2.715000 | | |
| 22: | −72.14400 | 1.620000 | 1.82017 | 46.40 |
| 23: | 72.64200 | 5.850000 | 1.85504 | 23.59 |
| 24: | −68.51000 | D(24) | | |
| 25: | −107.46500 | 4.720000 | 1.51976 | 52.20 |
| 26: | −39.76355 | 0.180000 | | |
| 27: | 3735.65200 | 6.570000 | 1.49845 | 81.00 |
| 28: | −34.52000 | 1.670000 | 1.85504 | 23.59 |
| 29: | −69.67900 | D(29) | | |
| 30: | 63.18200 | 8.270000 | 1.49845 | 81.00 |
| 31: | −40.91600 | 0.897000 | | |

TABLE 2A-continued

SECOND EMBODIMENT - LENS DATA

| Surface | Radius of Curvature (mm) | Thickness or Separation (mm) | Ne | Ve |
|---|---|---|---|---|
| 32: | −40.43195 | 1.800000 | 1.85649 | 32.03 |
| 33: | −86.49500 | | | |

Aspheric Coefficients
Surface 3:
K = −17.968728
A = 0.428864E−05
B = −0.185831E−08
C = 0.797541E−12
D = −0.132672E−15

TABLE 2B

SECOND EMBODIMENT - ZOOM POSITIONS

| f(mm) = Location | Wide (W) 15 | Intermediate-wide 19.2 | Intermediate-middle 23.5 | Intermediate-tele 31.2 | Telephoto (T) 40 |
|---|---|---|---|---|---|
| | | | Separation (mm) | | |
| D(11) | 40.35264 | 28.37933 | 19.83592 | 10.41300 | 3.59113 |
| D(18) | 2.86510 | 6.36627 | 10.79860 | 20.02631 | 30.40089 |
| D(24) | 29.00275 | 25.50714 | 21.06300 | 11.83560 | 1.47042 |
| D(29) | 1.07000 | 13.17541 | 20.27536 | 25.09023 | 21.63519 |

Figure 3B:
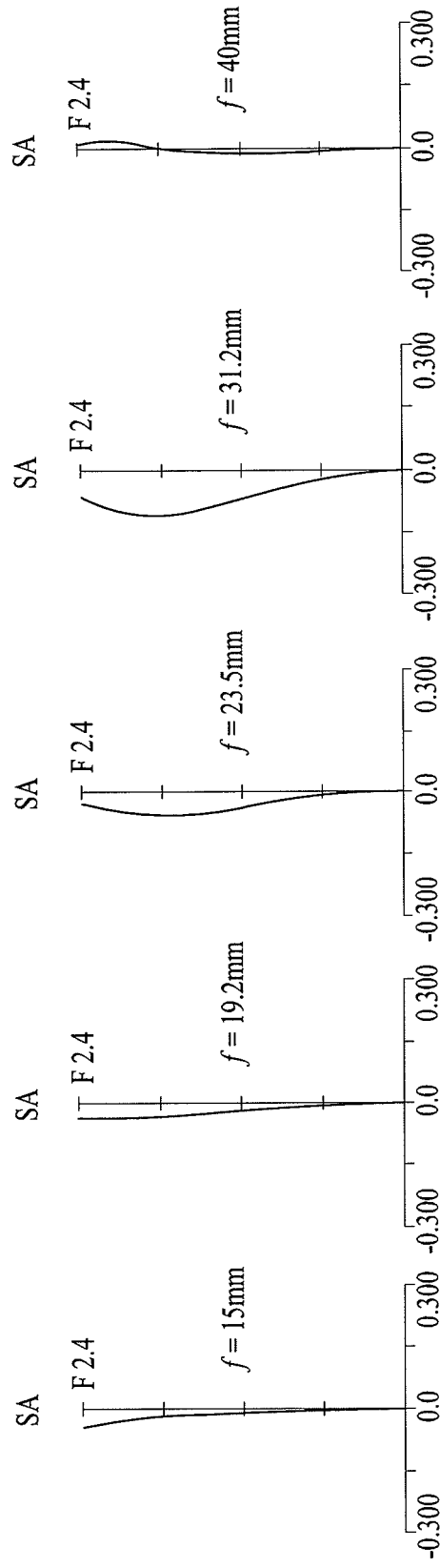
FIGS. 3B-3D illustrate aberration graphs of the second embodiment.
Figure 3C:
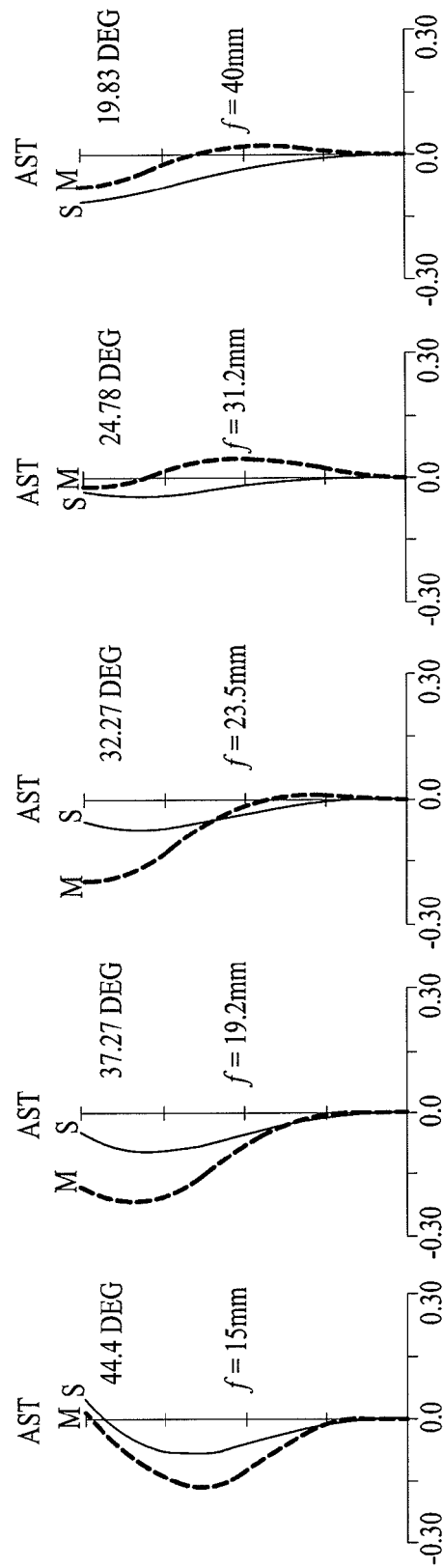
Figure 3D:
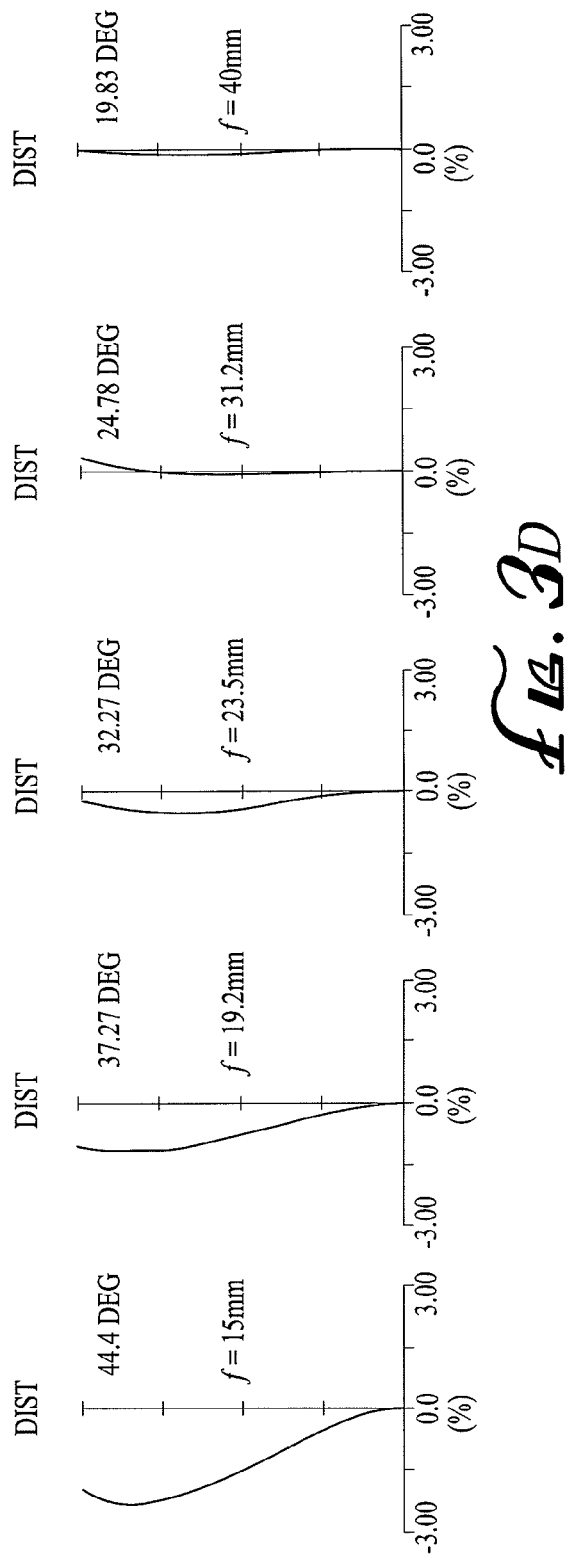

FIGS. 3B-3D illustrate aberration graphs of the second embodiment. The object distance is at infinity for all FIGS. 3B-3D. According to different focal lengths, FIGS. 3B, 3C, and 3D respectively show spherical aberration, astigmatism, and distortion.

Figure 3E:
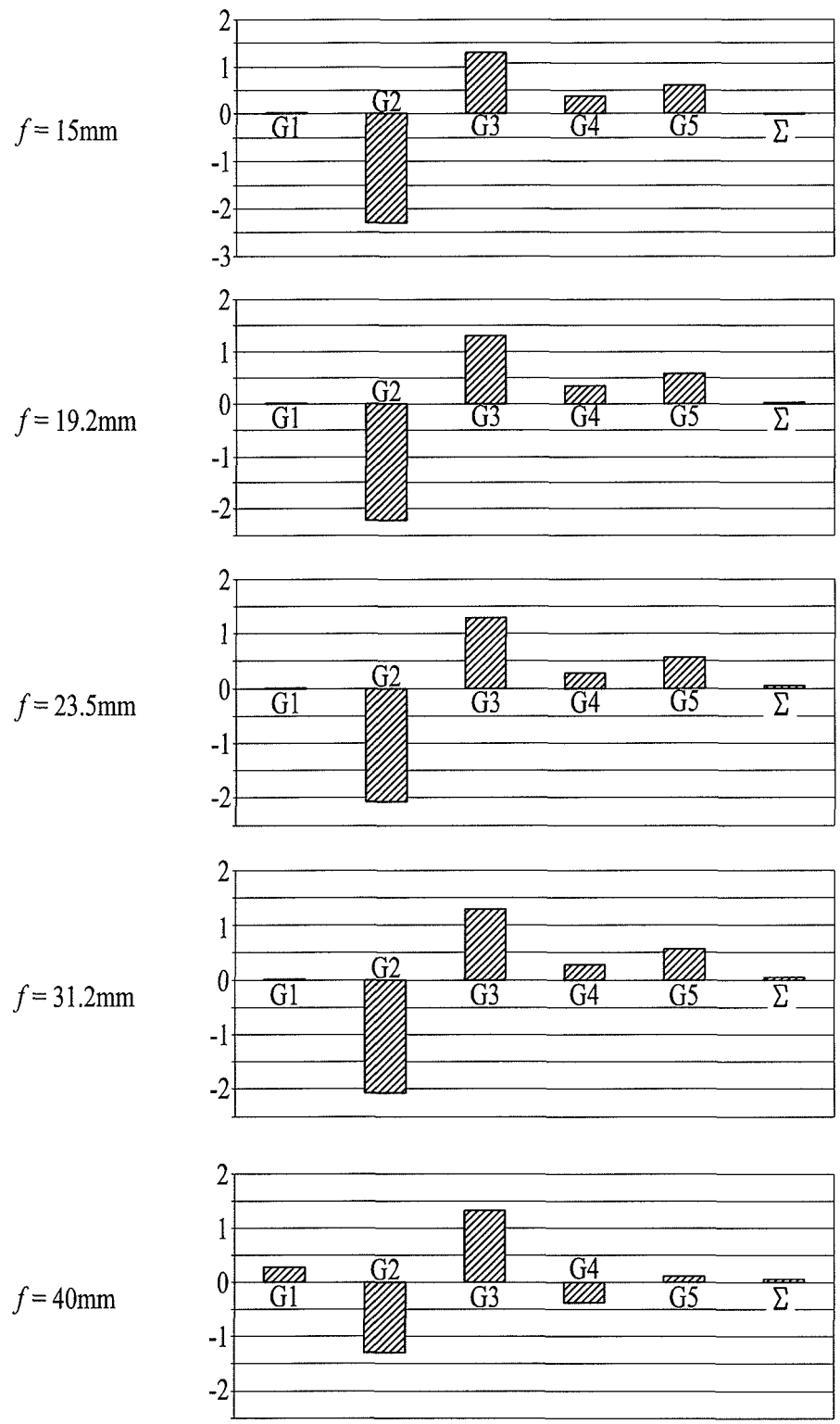
FIG. 3E illustrates third-order astigmatism aberration coefficient data for the second embodiment.

FIG. 3E illustrates a set of bar graphs showing third-order astigmatism aberration coefficient data for the second embodiment.

Example Third Embodiment

Figure 4A:
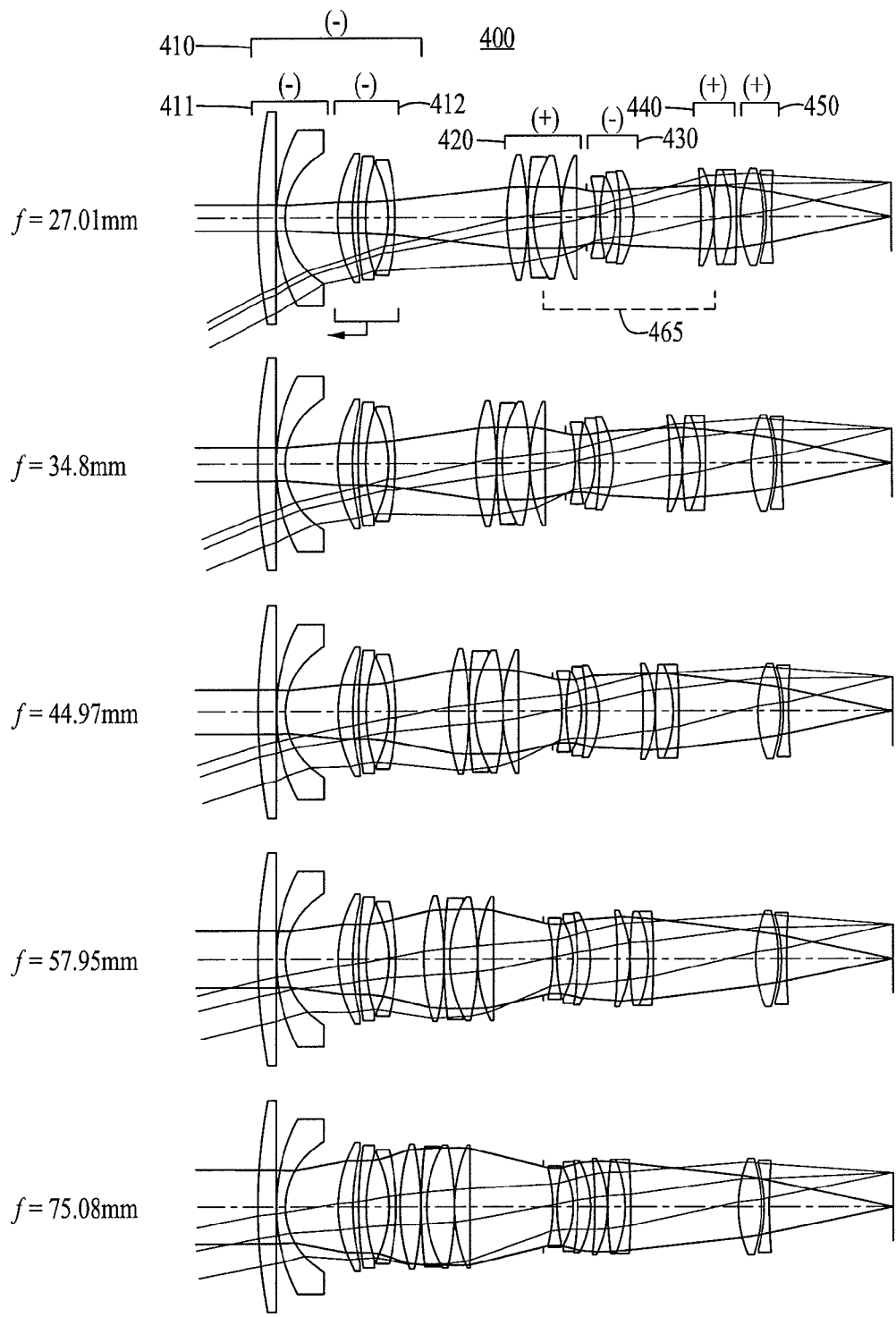
FIG. 4A illustrates a third embodiment.

FIG. 4A illustrates a third embodiment 400. From the wide-end (W) to the telephoto-end (T), the focal length ranges from 27.01 mm to 75.08 mm. The field of view is 56.32 degrees to 21.83 degrees. The F-number is F/2.43. The exit pupil distance is from −630.04 mm to −189.6 mm.

FIG. 4A shows five lens groups 410, 420, 430, 440, and 450 with a NPNPP power sequence. Lens group 410 includes two lens subgroups 411 and 412 with a NN power sequence. Third embodiment 400 has one asphere at a concave surface of a lens element in lens subgroup 411. The front lens element of lens group 410 is positive. Similar reference numbers in FIGS. 4A and 1A-1B refer to similar items.

Zoom movements for third embodiment 400 exemplify the general movement plan shown for system 100 in FIG. 1A. Lens group 410 may be stationary with respect to zooming. From the wide (W) position (f=27.01 mm) to the tele (T) position (f=75.08 mm), lens groups 420 and 440 move toward the object side according to matching movement plans, as indicated by reference character 465. In between f=57.95 mm and f=75.08 mm, lens group 430 moves toward the object side up to a turning point and then moves toward the image side. In between f=34.8 mm and f=57.95 mm, lens group 450 moves toward the image side up to a turning point and then moves toward the object side.

Focusing for third embodiment 400 exemplifies the general movement plan shown for lens group 110 in FIG. 1B. Lens subgroup 411 may be stationary during zooming and focusing. Lens subgroup 412 is shown at the focus position of object distance at infinity. Lens subgroup 412 may be movable for internal focusing within lens group 410. During progression from the end focus position of object distance at infinity to the other end focus position of minimum object distance, lens subgroup 412 may move monotonically toward the object side.

TABLE 3A provides lens data for the third embodiment. TABLE 3B provides the various zoom positions of the wide-end zoom position, three intermediate zoom positions, and the telephoto-end zoom position at five respective focal lengths (mm): 27.01, 34.8, 44.97, 57.95, and 75.08.

TABLE 3A

THIRD EMBODIMENT - LENS DATA

| Surface | Radius of Curvature (mm) | Thickness or Separation (mm) | Ne | Ve |
|---|---|---|---|---|
| 1: | 256.65900 | 7.270000 | 1.48915 | 70.1 |
| 2: | INFINITY | 0.250000 | | |
| 3: | 86.01200 | 3.700000 | 1.60548 | 60.4 |
| 4 (aspheric): | 28.92461 | 21.837000 | | |
| 5: | 57.17400 | 5.900000 | 1.81266 | 25.16 |
| 6: | 93.08400 | 2.507000 | | |
| 7: | 185.68300 | 3.150000 | 1.60548 | 60.4 |
| 8: | 71.73300 | 9.710000 | | |
| 9: | −50.13400 | 2.740000 | 1.69979 | 55.3 |
| 10: | −106.71300 | D(10) | | |
| 11: | 96.13600 | 8.250000 | 1.49845 | 81.0 |
| 12: | −125.44400 | 0.125000 | | |
| 13: | 215.91373 | 2.250000 | 1.85650 | 31.93 |
| 14: | 53.01100 | 11.650000 | 1.62033 | 63.0 |
| 15: | −121.88800 | 0.150000 | | |
| 16: | 64.81597 | 6.770000 | 1.60520 | 65.1 |
| 17: | 9102.46400 | D(17) | | |
| STO: | INFINITY | 3.870000 | | |
| 19: | −69.05100 | 1.710000 | 1.74435 | 52.4 |
| 20: | 76.20400 | 6.620000 | | |
| 21: | −33.52702 | 1.800000 | 1.73739 | 51.2 |
| 22: | −143.75700 | 5.828000 | 1.85650 | 31.93 |
| 23: | −41.77700 | D(23) | | |
| 24: | −159.24300 | 5.000000 | 1.73234 | 54.4 |
| 25: | −52.11000 | 0.165000 | | |
| 26: | 179.77800 | 7.500000 | 1.60548 | 60.4 |
| 27: | −50.92600 | 2.000000 | 1.85504 | 23.59 |
| 28: | −300.24400 | D(28) | | |
| 29: | 52.88800 | 9.500000 | 1.49845 | 81.0 |
| 30: | −66.23026 | 1.421000 | | |
| 31: | −64.42800 | 2.100000 | 1.61669 | 44.0 |
| 32: | 1280.06100 | | | |

Aspheric Coefficients
Surface 4:
K = −0.500426
A = 0.344005E−06
B = −0.926453E−10
C = 0.510771E−12
D = −0.315313E−16

TABLE 3B

THIRD EMBODIMENT - ZOOM POSITIONS

| f(mm) = Location | Wide (W) 27.01 | Inter-mediate-wide 34.8 | Inter-mediate-middle 44.97 | Inter-mediate-tele 57.95 | Tele-photo (T) 75.08 |
|---|---|---|---|---|---|
| | | | Separation (mm) | | |
| D(10) | 46.94710 | 33.60620 | 22.08280 | 11.46750 | 2.00000 |
| D(17) | 3.82220 | 8.28810 | 13.98270 | 20.92100 | 30.15470 |
| D(23) | 28.21960 | 23.75350 | 18.05880 | 11.12060 | 1.88760 |
| D(28) | 1.82500 | 19.09630 | 33.40540 | 42.87090 | 45.05690 |

Figure 4B:
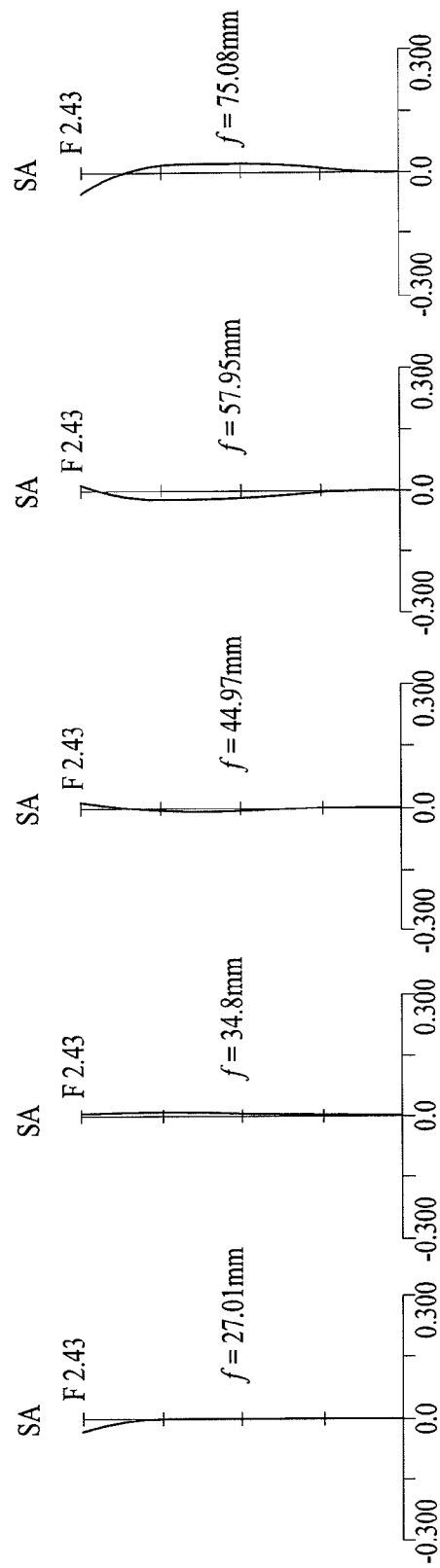
FIGS. 4B-4D illustrate aberration graphs of the third embodiment.
Figure 4C:
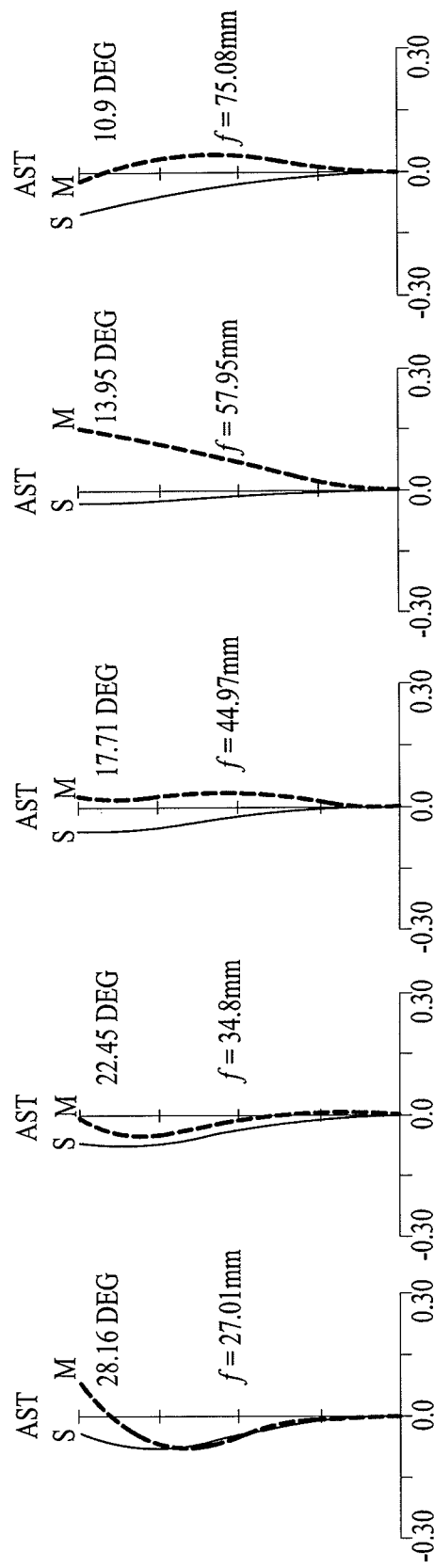
Figure 4D:
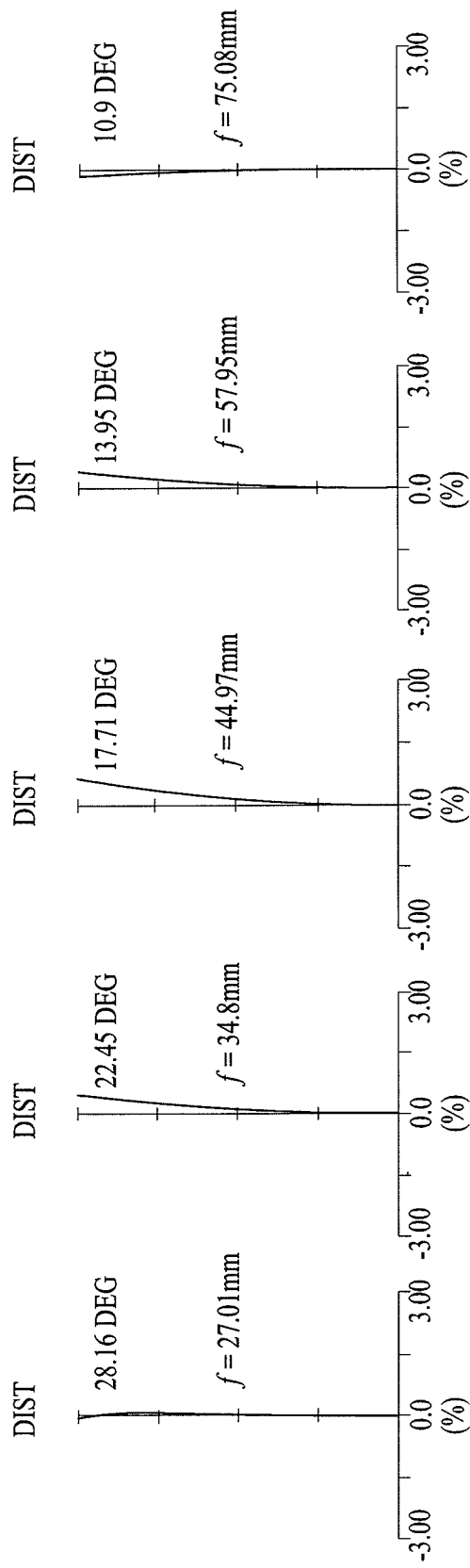

FIGS. 4B-4D illustrate aberration graphs of the third embodiment. The object distance is at infinity for all FIGS. 4B-4D. According to different focal lengths, FIGS. 4B, 4C, and 4D respectively show spherical aberration, astigmatism, and distortion.

Figure 4E:
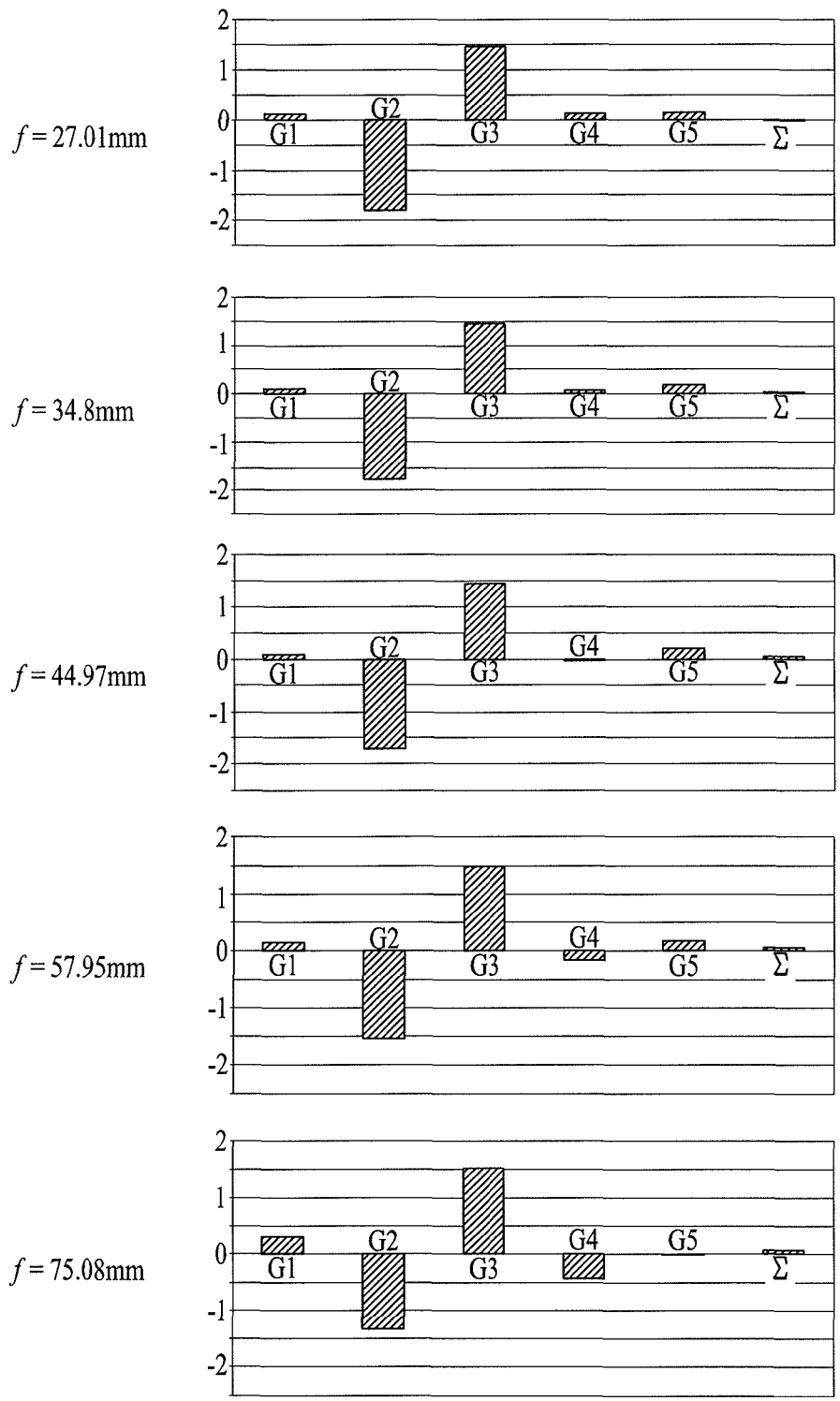
FIG. 4E illustrates third-order astigmatism aberration coefficient data for the third embodiment.

FIG. 4E illustrates a set of bar graphs showing third-order astigmatism aberration coefficient data for the third embodiment.

Example Fourth Embodiment

Figure 5A:
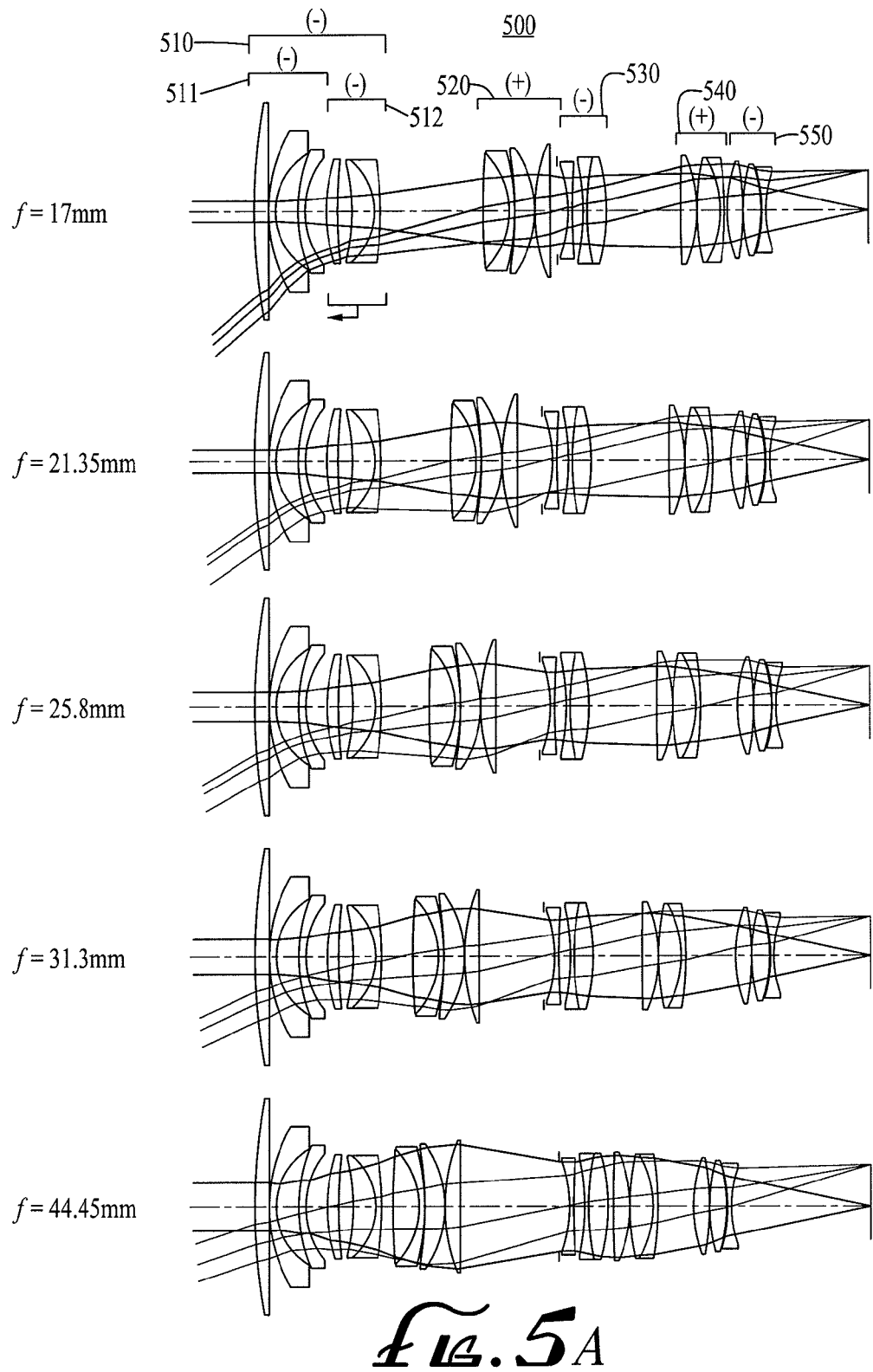
FIG. 5A illustrates a fourth embodiment.

FIG. 5A illustrates a fourth embodiment 500. From the wide-end (W) to the telephoto-end (T), the focal length ranges from 17 mm to 44.45 mm. The field of view is 82.78 degrees to 37.3 degrees. The F-number is F/2.45. The exit pupil distance is −99.85 mm to −40.27 mm. This example may be suitable for digital cameras without a mirror for an optical viewfinder.

FIG. 5A shows five lens groups 510, 520, 530, 540, and 550 with a NPNPN power sequence. Lens group 510 includes two lens subgroups 511 and 512 with a NN power sequence. Fourth embodiment 500 has one asphere at a concave surface of a lens element in lens subgroup 511. The front lens element of lens group 510 is positive. Similar reference numbers in FIGS. 5A and 1A-1B refer to similar items.

Zoom movements for fourth embodiment 500 exemplify the general movement plan shown for system 100 in FIG. 1A. Lens group 510 may be stationary with respect to zooming. From the wide (W) position (f=17 mm) to the tele (T) position (f=44.45 mm), lens groups 520 and 540 move toward the object side according to different movement plans. In between f=21.35 mm and f=31.3 mm, lens group 530 moves toward the object side up to a turning point and then moves toward the image side. In between f=21.35 mm and f=31.3 mm, lens group 550 moves toward the image side up to a turning point and then moves toward the object side.

Focusing for fourth embodiment 500 exemplifies the general movement plan shown for lens group 110 in FIG. 1B. Lens subgroup 511 may be stationary during zooming and focusing. Lens subgroup 512 is shown at the focus position of object distance at infinity. Lens subgroup 512 may be movable for internal focusing within lens group 510. During progression from the end focus position of object distance at infinity to the other end focus position of minimum object distance, lens subgroup 512 may move monotonically toward the object side.

TABLE 4A provides lens data for the fourth embodiment. TABLE 4B provides the various zoom positions of the wide-end zoom position, three intermediate zoom positions, and the telephoto-end zoom position at five respective focal lengths (mm): 17, 21.35, 25.8, 31.3., and 44.45.

TABLE 4A

FOURTH EMBODIMENT - LENS DATA

| Surface | Radius of Curvature (mm) | Thickness or Separation (mm) | Ne | Ve |
|---|---|---|---|---|
| 1: | 233.51476 | 5.200000 | 1.772500 | 49.6200 |
| 2: | 3443.65574 | 0.100000 | | |
| 3: | 61.53454 | 2.500000 | 1.834807 | 42.7137 |
| 4: | 25.47599 | 8.250000 | | |
| 5: | 58.92235 | 2.450000 | 1.729160 | 54.4992 |
| 6 (aspheric): | 27.83511 | 8.100000 | | |
| 7: | 70.55014 | 4.000000 | 1.784701 | 26.0766 |
| 8: | 136.94454 | 5.370000 | | |
| 9: | −71.82824 | 8.000000 | 1.688936 | 31.3079 |
| 10: | −25.23173 | 2.180000 | 1.883000 | 40.7600 |
| 11: | −151.85585 | D(11) | | |
| 12: | 281.88573 | 9.450000 | 1.603001 | 65.4436 |
| 13: | −30.98746 | 1.935000 | 1.850249 | 32.1701 |
| 14: | −82.24052 | 0.150000 | | |
| 15: | −138.51865 | 7.280000 | 1.486561 | 84.4680 |
| 16: | −42.03615 | 0.110000 | | |
| 17: | 68.61389 | 5.700000 | 1.788000 | 47.4899 |
| 18: | 5823.41244 | D(18) | | |

TABLE 4A-continued

FOURTH EMBODIMENT - LENS DATA

| Surface | Radius of Curvature (mm) | Thickness or Separation (mm) | Ne | Ve |
|---|---|---|---|---|
| STO: | INFINITY | 3.700000 | | |
| 20: | −52.88191 | 1.500000 | 1.883000 | 40.7600 |
| 21: | 198.28578 | 3.998597 | | |
| 22: | −92.82974 | 1.500000 | 1.733997 | 51.4706 |
| 23: | 86.21240 | 7.100000 | 1.846660 | 23.7799 |
| 24: | −73.41903 | D(24) | | |
| 25: | 531.59365 | 6.000000 | 1.496999 | 81.5459 |
| 26: | −54.70594 | 0.110000 | | |
| 27: | 83.73064 | 8.500000 | 1.497000 | 81.6103 |
| 28: | −40.78006 | 1.730000 | 1.805180 | 25.3597 |
| 29: | −122.92494 | D(29) | | |
| 30: | 51.67559 | 5.500000 | 1.497000 | 81.6103 |
| 31: | −113.48348 | 0.150000 | | |
| 32: | 57.93988 | 6.585735 | 1.517421 | 52.2001 |
| 33: | −54.87268 | 0.217000 | | |
| 34: | −54.64469 | 1.454035 | 1.883000 | 40.7600 |
| 35: | 42.14856 | | | |

Aspheric Coefficients
Surface 6:
K = −2.192003
A = 0.730253E−05
B = −0.795724E−08
C = 0.452619E−11
D = −0.612151E−14

TABLE 4B

FOURTH EMBODIMENT - ZOOM POSITIONS

| f(mm) = Location | Wide (W) 17 | Intermediate-wide 21.35 | Intermediate-middle 25.8 | Intermediate-tele 31.3 | Telephoto (T) 44.45 |
|---|---|---|---|---|---|
| | | | Separation (mm) | | |
| D(11) | 37.55000 | 25.45000 | 17.54653 | 11.25000 | 4.10611 |
| D(18) | 2.51890 | 9.00130 | 15.97603 | 23.49900 | 36.05000 |
| D(24) | 27.05000 | 28.30221 | 24.57054 | 17.70678 | 1.69620 |
| D(29) | 1.00000 | 6.79000 | 13.59985 | 18.25529 | 13.06600 |

Figure 5B:
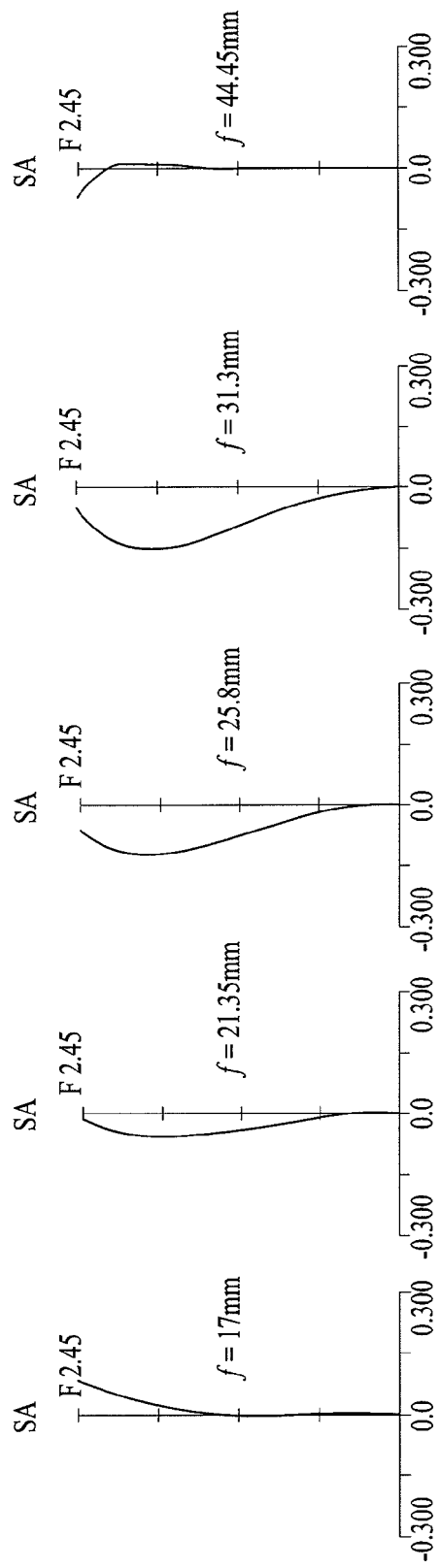
FIGS. 5B-5D illustrate aberration graphs of the fourth embodiment.
Figure 5C:
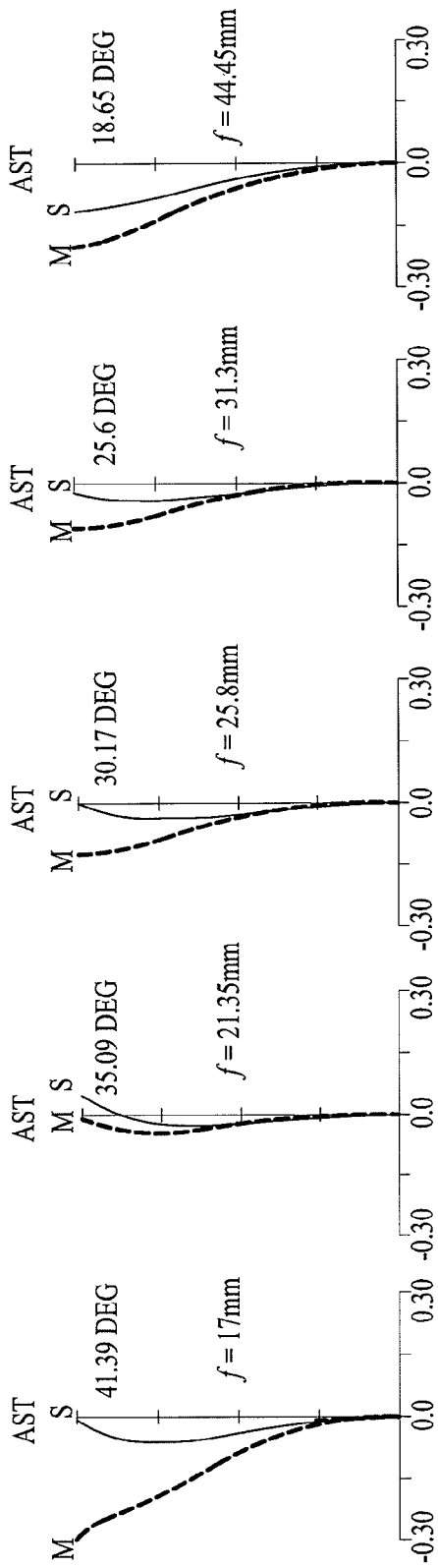
Figure 5D:
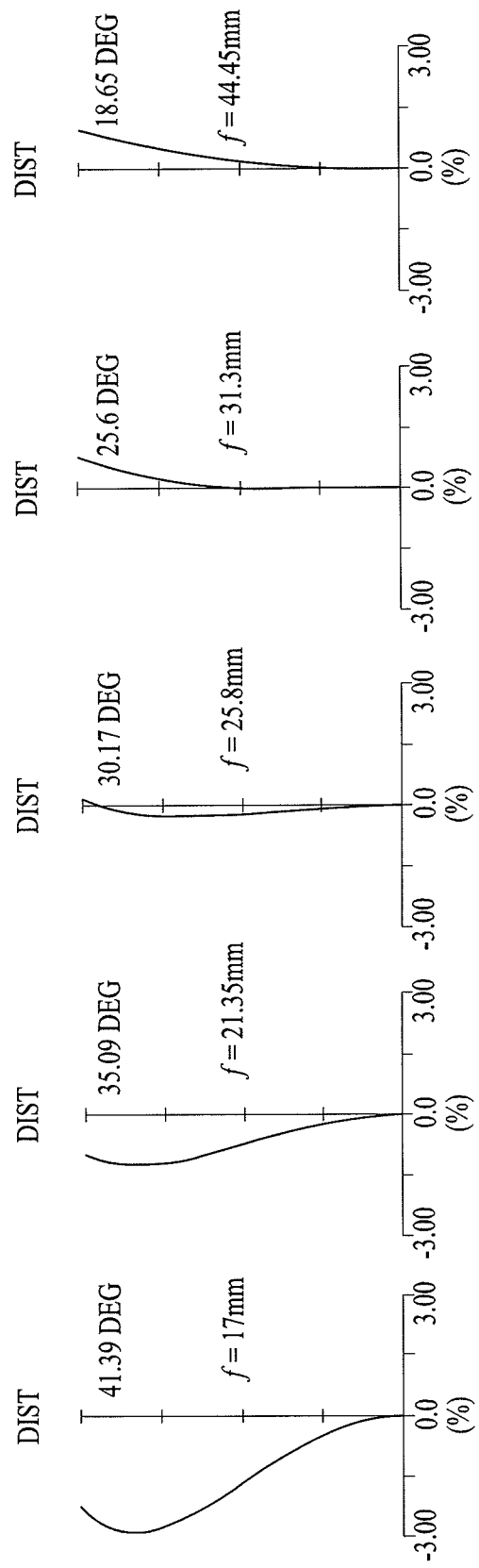

FIGS. 5B-5D illustrate aberration graphs of the fourth embodiment. The object distance is at infinity for all FIGS. 5B-5D. According to different focal lengths, FIGS. 5B, 5C, and 5D respectively show spherical aberration, astigmatism, and distortion.

Figure 5E:
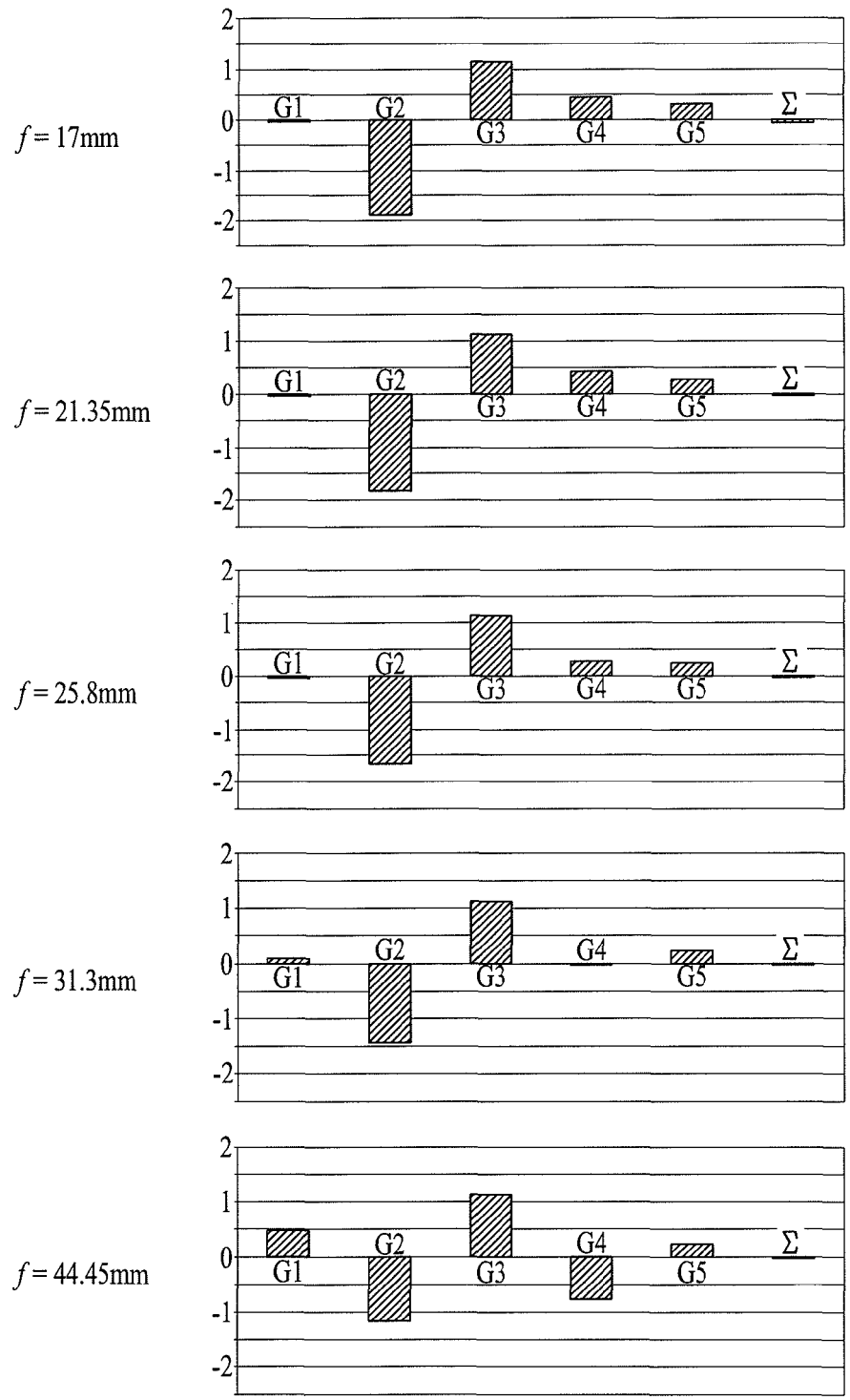
FIG. 5E illustrates third-order astigmatism aberration coefficient data for the fourth embodiment.

FIG. 5E illustrates a set of bar graphs showing third-order astigmatism aberration coefficient data for the fourth embodiment.

Example Fifth Embodiment

Figure 6A:
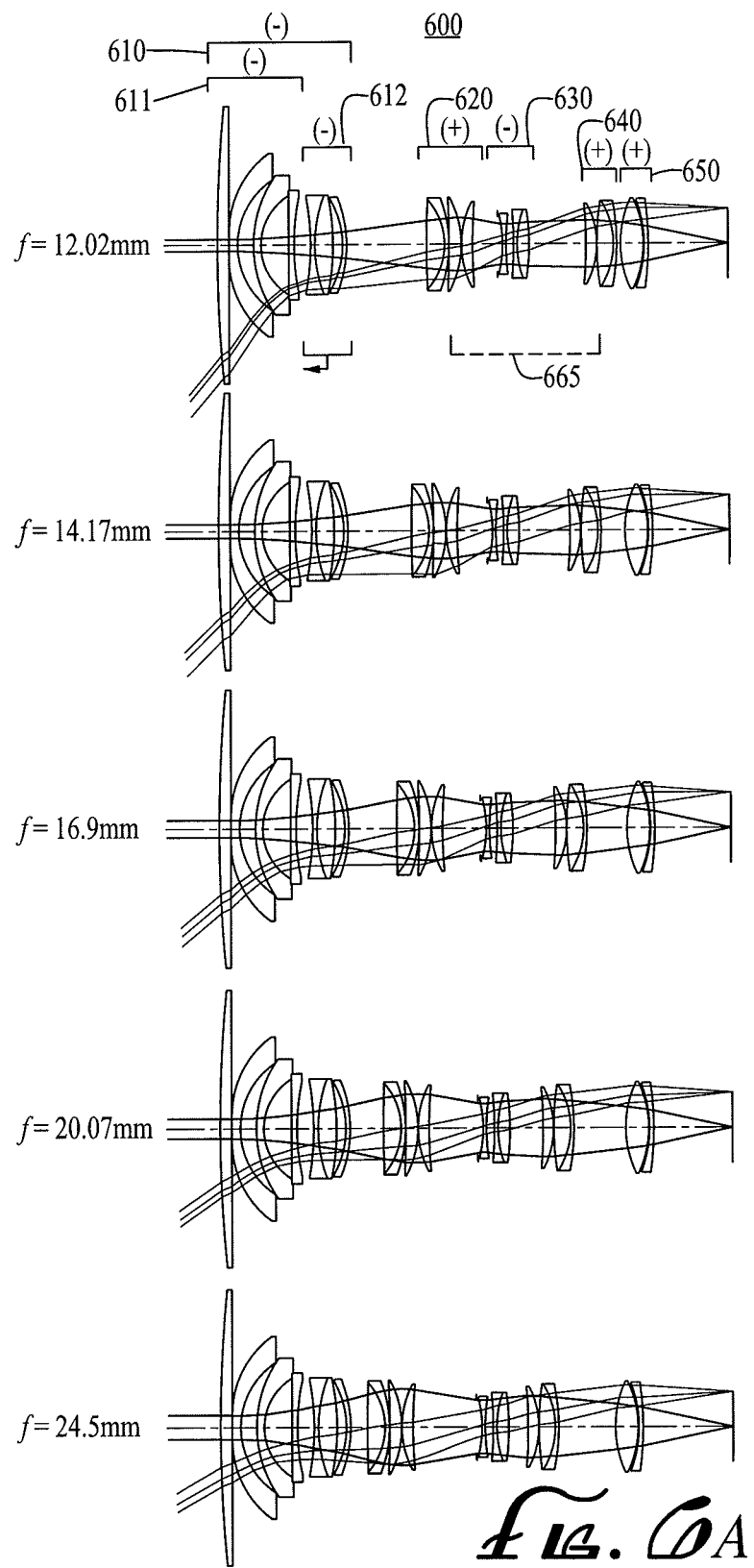
FIG. 6A illustrates a fifth embodiment.

FIG. 6A illustrates a fifth embodiment 600. From the wide-end (W) to the telephoto-end (T), the focal length ranges from 12.02 mm to 24.5 mm. The field of view is 101.1 degrees to 60.5 degrees. The F-number is F/2.4. The exit pupil distance is −1277.88 mm to −166.6 mm.

FIG. 6A shows five lens groups 610, 620, 630, 640, and 650 with a NPNPP power sequence. Lens group 610 includes two lens subgroups 611 and 612 with a NN power sequence. Fifth embodiment 600 has two aspheres: one at a convex surface of a lens element in lens subgroup 611 and another one at a concave surface of another lens element in lens subgroup 611. The front lens element of lens group 610 is positive. Similar reference numbers in FIGS. 6A and 1A-1B refer to similar items.

Zoom movements for fifth embodiment 600 exemplify the general movement plan shown for system 100 in FIG. 1A. Lens group 610 may be stationary with respect to zooming. From the wide (W) position (f=12.02 mm) to the tele (T) position (f=24.5 mm), lens groups 620 and 640 move toward the object side according to matching movement plans, as indicated by reference character 665. In between f=20.07 mm and f=24.5 mm, lens group 630 moves toward the object side up to a turning point and then moves toward the image side. In between f=14.17 mm and f=20.07 mm, lens group 550 moves toward the image side up to a turning point and then moves toward the object side.

Focusing for fifth embodiment 600 exemplifies the general movement plan shown for lens group 110 in FIG. 1B. Lens subgroup 611 may be stationary during zooming and focusing. Lens subgroup 612 is shown at the focus position of object distance at infinity. Lens subgroup 612 may be movable for internal focusing within lens group 610. During progression from the end focus position of object distance at infinity to the other end focus position of minimum object distance, lens subgroup 612 may move monotonically toward the object side.

TABLE 5A provides lens data for the fifth embodiment. TABLE 5B provides the various zoom positions of the wide-end zoom position, three intermediate zoom positions, and the telephoto-end zoom position at five respective focal lengths (mm): 12.02, 14.17, 16.9, 20.07, and 24.5.

TABLE 5A

FIFTH EMBODIMENT - LENS DATA

| Surface | Radius of Curvature (mm) | Thickness or Separation (mm) | Ne | Ve |
|---|---|---|---|---|
| 1: | 553.01635 | 5.000000 | 1.486561 | 84.468 |
| 2: | INFINITY | 0.150000 | | |
| 3 (aspheric): | 121.72713 | 3.200000 | 1.729160 | 54.499 |
| 4: | 32.74413 | 6.850000 | | |
| 5: | 49.84652 | 3.080000 | 1.804000 | 46.57 |
| 6 (aspheric): | 28.14129 | 10.980000 | | |
| 7: | 380.64431 | 2.500000 | 1.850249 | 32.17 |
| 8: | 92.40340 | 6.977000 | | |
| 9: | −104.68356 | 1.880000 | 1.753930 | 52.271 |
| 10: | 54.82434 | 7.650000 | 1.647689 | 33.848 |
| 11: | −90.44077 | 3.800000 | | |
| 12: | −38.43433 | 1.820000 | 1.883000 | 40.76 |
| 13: | −50.84079 | D(13) | | |
| 14: | 386.45239 | 7.700000 | 1.497821 | 66.955 |
| 15: | −27.82851 | 1.700000 | 1.850249 | 32.17 |
| 16: | −50.22315 | 0.110000 | | |
| 17: | −307.51707 | 4.900000 | 1.511121 | 60.406 |
| 18: | −41.69894 | 0.150000 | | |
| 19: | 41.01643 | 4.500000 | 1.501371 | 56.409 |
| 20: | 279.66776 | D(20) | | |
| STO: | INFINITY | 2.300000 | | |
| 22: | −45.29720 | 1.300000 | 1.883000 | 40.76 |
| 23: | 102.74188 | 3.070000 | | |
| 24: | −153.73303 | 1.330000 | 1.816000 | 46.621 |
| 25: | 40.32906 | 5.100000 | 1.846660 | 23.78 |
| 26: | −85.31484 | D(26) | | |
| 27: | −176.63450 | 4.450000 | 1.497000 | 81.61 |
| 28: | −33.37039 | 0.150000 | | |
| 29: | 130.06092 | 7.000000 | 1.496999 | 81.546 |
| 30: | −30.58025 | 1.370000 | 1.846660 | 23.78 |
| 31: | −84.94893 | D(31) | | |
| 32: | 44.65641 | 9.250000 | 1.486561 | 84.468 |
| 33: | −44.65565 | 0.578000 | | |

TABLE 5A-continued

FIFTH EMBODIMENT - LENS DATA

| Surface | Radius of Curvature (mm) | Thickness or Separation (mm) | Ne | Ve |
|---|---|---|---|---|
| 34: | −46.04337 | 1.504792 | 1.850249 | 32.17 |
| 35: | −120.39496 | | | |

Aspheric Coefficients
Surface 3:
K = 7.985102
A = 0.763699E−05
B = −0.661282E−08
C = 0.362157E−11
D = −0.635851E−15
Surface 6:
K = 0.50102
A = 0.624868E−05
B = 0.794937E−08
C = −0.647086E−10
D = 0.864375E−13

TABLE 5B

FIFTH EMBODIMENT - ZOOM POSITIONS

| f(mm) = Location | Wide (W) 12.02 | Intermediate-wide 14.17 | Intermediate-middle 16.9 Separation (mm) | Intermediate-tele 20.07 | Telephoto (T) 24.5 |
|---|---|---|---|---|---|
| D(13) | 32.79451 | 25.79116 | 19.28358 | 13.24986 | 6.73732 |
| D(20) | 10.22112 | 12.57904 | 15.97000 | 20.04302 | 26.02286 |
| D(26) | 23.63780 | 21.28000 | 17.88700 | 13.81580 | 7.83880 |
| D(31) | 1.74500 | 9.75210 | 16.73440 | 21.52240 | 23.35000 |

Figure 6C:
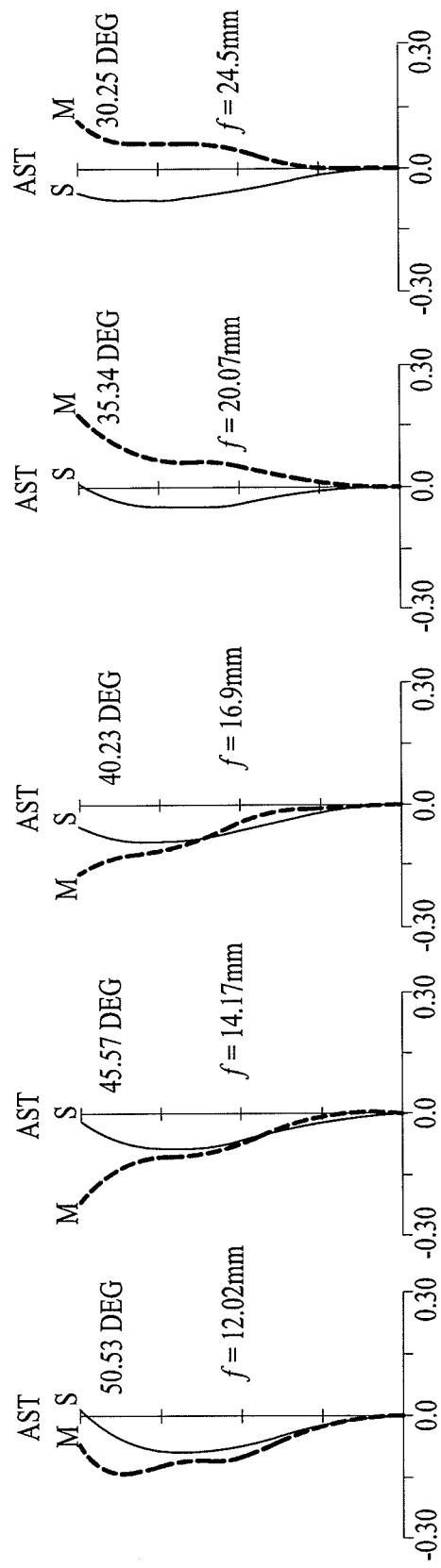
Figure 6D:
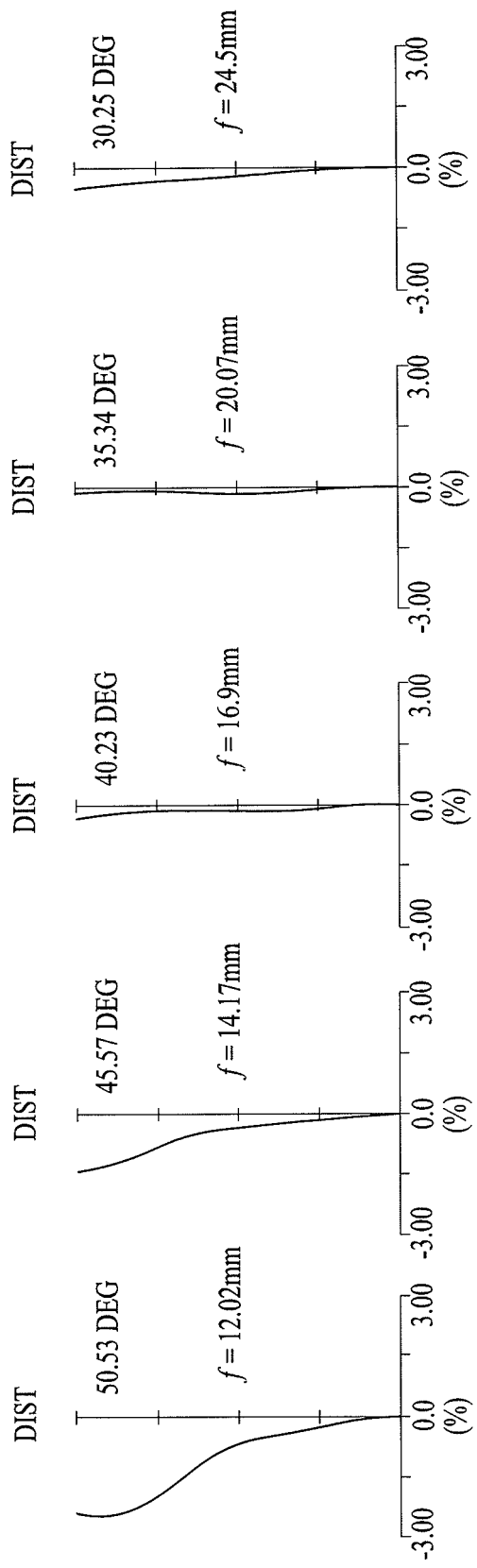

FIGS. 6B-6D illustrate aberration graphs of the fifth embodiment. The object distance is at infinity for all FIGS. 6B-6D. According to different focal lengths, FIGS. 6B, 6C, and 6D respectively show spherical aberration, astigmatism, and distortion.

Figure 6E:
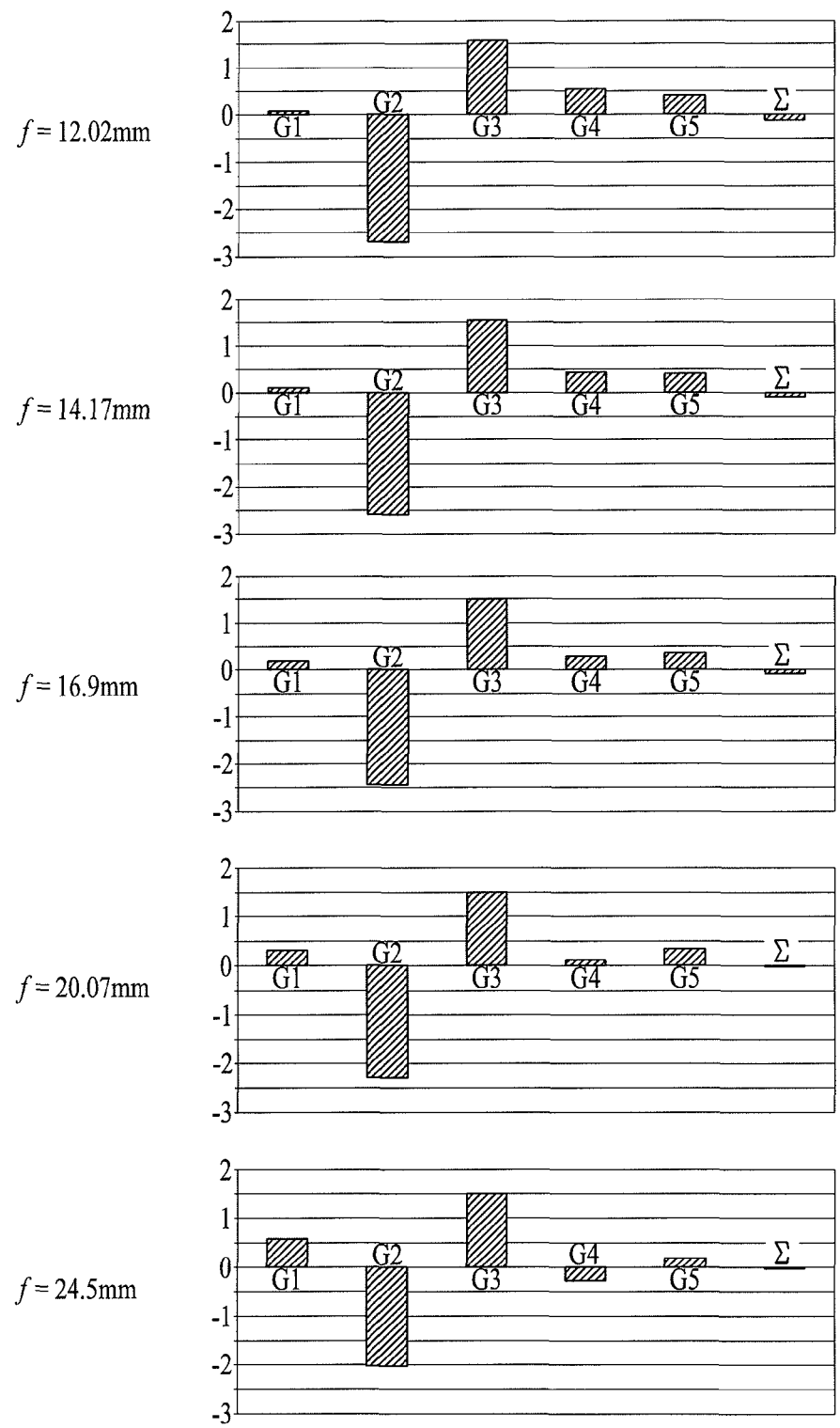
FIG. 6E illustrates third-order astigmatism aberration coefficient data for the fifth embodiment.

FIG. 6E illustrates a set of bar graphs showing third-order astigmatism aberration coefficient data for the fifth embodiment.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A zoom lens system for forming an image of an object, said system having an object side and an image side, said system having a wide position and a tele position for zooming, said system comprising in order from the object side to the image side:
a first lens group with negative power and having a stationary lens element;
a second lens group with positive power;
a third lens group with negative power;
a fourth lens group with positive power; and
a fifth lens group;
wherein the second, third, fourth, and fifth lens groups are movable to vary magnification of the image during zooming,
the second and fourth lens groups moving toward the object side during zooming from the wide position to the tele position, and
the fifth lens group moving at first toward the image side and then toward the object side during zooming from the wide position to the tele position.

2. The system of claim 1, the third lens group moving toward the object side and then toward the image side during zooming from the wide position to the tele position.

3. The system of claim 1, the second and fourth lens groups having matching movement plans.

4. The system of claim 1, the fifth lens group operating as a field flattener.

5. The system of claim 1 including only one aspheric surface.

6. The system of claim 1 having an F-number of F/2.8 or less.

7. The system of claim 1 incorporated into an image capture device, a wide angle zoom lens, an infrared zoom lens, space optics, or a projection zoom lens.

8. A zoom lens system for forming an image of an object, said system having an object side and an image side, said system comprising in order from the object side to the image side:
a first lens group with negative power, the first lens group including:
a first lens subgroup with negative power and being stationary and
a second lens subgroup with negative power and including a lens element being movable to vary focus of the image;
a second lens group with positive power;
a third lens group with negative power;
a fourth lens group with positive power; and
wherein the second, third, and fourth lens groups are movable to vary magnification of the image during zooming.

9. The system of claim 8, the first lens subgroup comprising only negative lens elements.

10. The system of claim 8, the first lens subgroup including a positive front lens element.

11. The system of claim 8, the first lens group including either one or no aspheric surface.

12. The system of claim 8, the first lens group including only one aspheric surface, the first lens subgroup including the only one aspheric surface.

13. The system of claim 8 having an F-number of F/2.8 or less.

14. The system of claim 8 incorporated into an image capture device, a wide angle zoom lens, an infrared zoom lens, space optics, or a projection zoom lens.

15. A zoom lens system for forming an image of an object, said system having an object side and an image side, said system having a wide position and a tele position for zooming, said system comprising in order from the object side to the image side:
a first lens group with negative power, the first lens group including:
a first lens subgroup with negative power and being stationary and
a second lens subgroup with negative power and including a lens element being movable to vary focus of the image;
a second lens group with positive power;
a third lens group with negative power;
a fourth lens group * with positive power; and
a fifth lens group;
wherein the second, third, fourth, and fifth lens groups are movable to vary magnification of the image during zooming, the second and fourth lens groups moving toward the object side during zooming from the wide position to the tele position, and the fifth lens group moving at first toward the image side and then toward the object side during zooming from the wide position to the tele position.

* * * * *